(12) United States Patent
Biernath et al.

(10) Patent No.: US 10,909,607 B2
(45) Date of Patent: Feb. 2, 2021

(54) SYSTEMS, METHODS AND DEVICES FOR CONTROLLING HUMIDITY IN A CLOSED ENVIRONMENT WITH AUTOMATIC AND PREDICTIVE IDENTIFICATION, PURCHASE AND REPLACEMENT OF OPTIMAL HUMIDITY CONTROLLER

(71) Applicant: Boveda Inc., Minnetonka, MN (US)

(72) Inventors: Rolf W. Biernath, Wyoming, MN (US);
Jason L. Schmitz, Akron, OH (US);
Robert L. Esse, Monticello, MN (US);
Sean A. Knutsen, Chanhassen, MN (US); Brian Rice, Greenfield, MN (US)

(73) Assignee: BOVEDA INC., Minnetonka, MN (US)

( * ) Notice: Subject to any disclaimer, the term of this patent is extended or adjusted under 35 U.S.C. 154(b) by 257 days.

(21) Appl. No.: 16/053,365

(22) Filed: Aug. 2, 2018

(65) Prior Publication Data

US 2018/0342006 A1    Nov. 29, 2018

Related U.S. Application Data

(63) Continuation-in-part of application No. 14/732,079, filed on Jun. 5, 2015, now Pat. No. 10,055,781.

(51) Int. Cl.
*G06Q 30/06* (2012.01)

(52) U.S. Cl.
CPC ..... *G06Q 30/0631* (2013.01); *G06Q 30/0633* (2013.01)

(58) Field of Classification Search
CPC ................................................ G06Q 30/06–08

(Continued)

(56) References Cited

U.S. PATENT DOCUMENTS

| 4,567,563 A | 1/1986 | Hirsch |
| 5,021,939 A | 7/1991 | Pulgiese |

(Continued)

FOREIGN PATENT DOCUMENTS

| CA | 2785404 | 2/2014 |
| CN | 2461094 | 11/2001 |

(Continued)

OTHER PUBLICATIONS

Desiccant Technology for HVAC Applications, Andrew Lowenstein, PhD, Apr. 16, 2008 (Year: 2008).*

(Continued)

*Primary Examiner* — Ming Shui
(74) *Attorney, Agent, or Firm* — Padda Law Group

(57) ABSTRACT

The invention relates to systems and methods for monitoring and providing humidity control for an asset within a closed environment such as a storage container, with transmission of sensed humidity levels to at least one server that stores current and historical humidity levels and comprises a processor and stored executable instructions that, when executed by the processor, may recommend an optimal humidity controller to use for the asset, determine when the recommended humidity controller requires replacement and predictively recommend an optimal replacement humidity controller based on at least historical humidity data and trending thereof, execution of a sales transaction, that may be pre-scheduled based on asset type, asset size and/or historical data, for the optimal replacement humidity controller, and providing the proper replacement humidity controller to the user.

17 Claims, 20 Drawing Sheets

(58) Field of Classification Search
USPC .............................................. 705/26.1–27.2
See application file for complete search history.

(56) References Cited

U.S. PATENT DOCUMENTS

| | | | |
|---|---|---|---|
| 5,353,862 A | 10/1994 | Akiyama | |
| 5,546,974 A | 8/1996 | Bireley | |
| 5,563,811 A | 10/1996 | Embree | |
| 5,621,669 A | 4/1997 | Bjornsson | |
| 5,743,465 A | 4/1998 | Jeong | |
| 5,764,065 A | 6/1998 | Richards et al. | |
| 5,798,945 A | 8/1998 | Benda | |
| 5,936,178 A * | 8/1999 | Saari | A24F 25/02 84/453 |
| 6,157,306 A | 12/2000 | Mularoni | |
| 6,192,325 B1 | 2/2001 | Piety et al. | |
| 6,198,394 B1 | 3/2001 | Jacobsen et al. | |
| 6,209,717 B1 * | 4/2001 | Flynn | G10G 7/005 206/204 |
| 6,308,437 B1 * | 10/2001 | Villar | A24F 25/02 34/210 |
| 6,326,930 B1 | 12/2001 | Jones | |
| 6,385,510 B1 | 5/2002 | Hoog et al. | |
| 6,450,411 B1 | 9/2002 | Rash et al. | |
| 6,452,499 B1 | 9/2002 | Runge et al. | |
| 6,553,336 B1 | 4/2003 | Johnson et al. | |
| 6,567,769 B2 | 5/2003 | Chang | |
| 6,573,837 B2 | 6/2003 | Bluteau | |
| 6,643,801 B1 | 11/2003 | Jammu et al. | |
| 6,685,104 B1 | 2/2004 | Float et al. | |
| 6,693,535 B2 | 2/2004 | Von Bosch et al. | |
| 6,701,274 B1 | 3/2004 | Eryurek et al. | |
| 6,738,748 B2 | 5/2004 | Wetzer | |
| 6,799,154 B1 | 9/2004 | Aragones et al. | |
| 6,822,200 B1 | 11/2004 | Grosch et al. | |
| 6,826,514 B1 | 11/2004 | Antico et al. | |
| 6,850,162 B2 | 2/2005 | Cacioli et al. | |
| 6,919,803 B2 | 7/2005 | Breed | |
| 6,932,856 B2 | 8/2005 | Rake | |
| 6,977,585 B2 | 12/2005 | Falk et al. | |
| 7,015,713 B2 | 3/2006 | Kou | |
| 7,015,789 B1 | 3/2006 | Helgeson | |
| 7,053,765 B1 | 5/2006 | Clark | |
| 7,110,862 B2 | 9/2006 | Park | |
| 7,140,468 B2 | 11/2006 | Rake et al. | |
| 7,234,313 B2 | 6/2007 | Bell et al. | |
| 7,266,960 B2 | 9/2007 | Shah | |
| 7,315,246 B2 | 1/2008 | Rajapakse et al. | |
| RE40,073 E | 2/2008 | Breed | |
| 7,343,136 B2 | 3/2008 | Liu et al. | |
| 7,378,954 B2 | 5/2008 | Wendt | |
| 7,456,736 B2 | 11/2008 | Primm et al. | |
| 7,516,740 B2 | 4/2009 | Meier | |
| 7,528,711 B2 | 5/2009 | Kates | |
| 7,574,283 B2 | 8/2009 | Wang et al. | |
| 7,658,336 B2 | 2/2010 | Kates | |
| 7,710,256 B2 | 5/2010 | Tawil | |
| 7,733,236 B2 | 6/2010 | Montena et al. | |
| 7,751,942 B2 | 7/2010 | Lorton et al. | |
| 7,764,180 B2 | 7/2010 | Huang | |
| 7,777,496 B2 | 8/2010 | Evans et al. | |
| 7,810,515 B2 | 10/2010 | Nies et al. | |
| 7,854,389 B2 | 12/2010 | Ahmed | |
| 7,920,601 B2 | 4/2011 | Andrus et al. | |
| 7,933,836 B2 | 4/2011 | Erhart et al. | |
| 7,961,093 B2 | 6/2011 | Chiao et al. | |
| 8,006,407 B2 | 8/2011 | Anderson | |
| 8,020,777 B2 | 9/2011 | Kates | |
| 8,085,145 B2 | 12/2011 | Fu et al. | |
| 8,145,330 B2 | 3/2012 | Emoto | |
| 8,154,398 B2 | 4/2012 | Rolf et al. | |
| 8,159,338 B2 | 4/2012 | Breed | |
| 8,224,034 B2 | 7/2012 | Tanaka et al. | |
| 8,225,810 B2 | 7/2012 | Blanchard | |
| 8,245,720 B2 | 8/2012 | Grill et al. | |
| 8,258,943 B2 | 9/2012 | Park et al. | |
| 8,280,555 B2 | 10/2012 | Masui et al. | |
| 8,294,373 B2 | 10/2012 | Ko et al. | |
| 8,302,881 B1 | 11/2012 | Campbell et al. | |
| 8,310,363 B2 | 11/2012 | Breed | |
| 8,339,263 B2 | 12/2012 | Paananen et al. | |
| 8,350,710 B2 | 1/2013 | Logan et al. | |
| 8,351,199 B2 | 1/2013 | Tian et al. | |
| 8,374,725 B1 | 2/2013 | Ols | |
| 8,396,821 B2 | 3/2013 | Kuhns et al. | |
| 8,434,804 B2 | 5/2013 | Slessman | |
| 8,447,703 B2 | 5/2013 | Yuasa et al. | |
| 8,491,702 B2 | 7/2013 | Bash et al. | |
| 8,536,998 B1 | 9/2013 | Siu et al. | |
| 8,547,237 B2 | 10/2013 | Adebimpe | |
| 8,558,687 B2 | 10/2013 | Haupt et al. | |
| 8,577,359 B2 | 11/2013 | Wesby | |
| 8,579,264 B1 | 11/2013 | Fowles | |
| 8,599,012 B2 | 12/2013 | Schechter et al. | |
| 8,622,955 B2 | 1/2014 | Moberg et al. | |
| 8,640,360 B2 | 2/2014 | Stamm et al. | |
| 8,648,395 B2 | 2/2014 | Cummins | |
| 8,649,907 B2 | 2/2014 | Ersavas | |
| 8,694,277 B2 | 4/2014 | Corwin et al. | |
| 8,695,888 B2 | 4/2014 | Kates | |
| 8,748,723 B1 * | 6/2014 | Egberg | G10G 7/00 84/453 |
| 8,749,366 B2 | 6/2014 | Hwang et al. | |
| 8,793,024 B1 | 7/2014 | Woytowitz et al. | |
| 2002/0031142 A1 | 3/2002 | Metin et al. | |
| 2002/0033759 A1 | 3/2002 | Morello | |
| 2002/0070129 A1 | 6/2002 | Tunstall-Behrens | |
| 2002/0095269 A1 | 7/2002 | Natalini et al. | |
| 2003/0004784 A1 | 1/2003 | Li et al. | |
| 2004/0073468 A1 | 4/2004 | Vyas et al. | |
| 2004/0148136 A1 | 7/2004 | Sasaki et al. | |
| 2004/0222306 A1 | 11/2004 | Fajarillo | |
| 2004/0243737 A1 | 12/2004 | Beardsley et al. | |
| 2005/0054897 A1 | 3/2005 | Hashimoto et al. | |
| 2005/0088300 A1 | 4/2005 | Leung | |
| 2005/0151656 A1 | 7/2005 | Yuen | |
| 2006/0048845 A1 | 3/2006 | Slavin et al. | |
| 2006/0174693 A1 | 8/2006 | Chen et al. | |
| 2006/0226037 A1 | 10/2006 | Field | |
| 2007/0004449 A1 | 1/2007 | Sham | |
| 2007/0023940 A1 | 2/2007 | Siess, III | |
| 2007/0026107 A1 | 2/2007 | Wang et al. | |
| 2007/0033113 A1 | 2/2007 | Trew | |
| 2007/0089365 A1 | 4/2007 | Rowe | |
| 2007/0126433 A1 | 6/2007 | Theophanous et al. | |
| 2007/0246642 A1 | 10/2007 | Millett et al. | |
| 2007/0276626 A1 | 11/2007 | Bruffey | |
| 2007/0299706 A1 | 12/2007 | Galt et al. | |
| 2008/0058740 A1 | 3/2008 | Sullivan et al. | |
| 2008/0064420 A1 | 3/2008 | Aldern et al. | |
| 2008/0073431 A1 | 3/2008 | Davis | |
| 2008/0074274 A1 | 3/2008 | Hu et al. | |
| 2008/0104976 A1 | 5/2008 | Guglielmetti et al. | |
| 2008/0217419 A1 | 9/2008 | Ehlers et al. | |
| 2008/0219193 A1 | 9/2008 | Tang et al. | |
| 2008/0287747 A1 | 11/2008 | Mestrovic et al. | |
| 2009/0039173 A1 | 2/2009 | Mammon | |
| 2009/0069642 A1 | 3/2009 | Gao et al. | |
| 2009/0080428 A1 | 3/2009 | Witkowski et al. | |
| 2009/0106125 A1 | 4/2009 | Rock et al. | |
| 2009/0177330 A1 | 7/2009 | Kah, Jr. | |
| 2009/0179338 A1 | 7/2009 | Cottier | |
| 2009/0185959 A1 | 7/2009 | Weber et al. | |
| 2009/0223128 A1 | 9/2009 | Kuschak | |
| 2009/0293524 A1 | 12/2009 | Vezina et al. | |
| 2009/0307000 A1 | 12/2009 | Scheid et al. | |
| 2009/0322542 A1 | 12/2009 | Ding et al. | |
| 2010/0012739 A1 * | 1/2010 | Hoeth | G10G 7/00 236/44 C |
| 2010/0038440 A1 | 2/2010 | Ersavas | |
| 2010/0156663 A1 | 6/2010 | Pal et al. | |
| 2010/0275919 A1 | 11/2010 | Sung | |
| 2010/0282184 A1 | 11/2010 | Larson | |
| 2011/0003547 A1 | 1/2011 | Oh et al. | |

(56) References Cited

U.S. PATENT DOCUMENTS

| | | | |
|---|---|---|---|
| 2011/0057812 A1 | 3/2011 | Matsuda et al. | |
| 2011/0061477 A1 | 3/2011 | Fitz | |
| 2011/0082599 A1 | 4/2011 | Shinde et al. | |
| 2011/0112692 A1 | 5/2011 | Chan | |
| 2011/0137472 A1 | 6/2011 | Hitt et al. | |
| 2011/0230160 A1 | 9/2011 | Felgate | |
| 2011/0277547 A1 | 11/2011 | Duncan | |
| 2012/0019382 A1 | 1/2012 | Köhler et al. | |
| 2012/0023428 A1 | 1/2012 | Kennard et al. | |
| 2012/0109387 A1 | 5/2012 | Martin et al. | |
| 2012/0150677 A1* | 6/2012 | Shuster | G06Q 30/0633 705/26.1 |
| 2012/0205455 A1 | 8/2012 | Campo | |
| 2012/0221154 A1 | 8/2012 | Runge | |
| 2012/0229277 A1 | 9/2012 | Gabriel et al. | |
| 2012/0297646 A1 | 11/2012 | Brault | |
| 2013/0036755 A1 | 2/2013 | Kang | |
| 2013/0046398 A1 | 2/2013 | Hain et al. | |
| 2013/0053988 A1 | 2/2013 | Lin | |
| 2013/0063602 A1 | 3/2013 | Scapier | |
| 2013/0097276 A1 | 4/2013 | Sridhar | |
| 2013/0111077 A1 | 5/2013 | Gowravarm et al. | |
| 2013/0118070 A1 | 5/2013 | Marquez | |
| 2013/0133404 A1 | 5/2013 | Patel et al. | |
| 2013/0158722 A1 | 6/2013 | Chen et al. | |
| 2013/0160522 A1 | 6/2013 | Kromrey | |
| 2013/0167571 A1 | 7/2013 | Nakagawa | |
| 2013/0182360 A1 | 7/2013 | Stevens et al. | |
| 2013/0186965 A1 | 7/2013 | Wang et al. | |
| 2013/0199772 A1 | 8/2013 | Fischer et al. | |
| 2013/0215548 A1 | 8/2013 | Eastman et al. | |
| 2013/0220708 A1 | 8/2013 | Kim et al. | |
| 2013/0233933 A1 | 9/2013 | Dostmann | |
| 2013/0255783 A1 | 10/2013 | Runge et al. | |
| 2013/0271286 A1 | 10/2013 | Quan et al. | |
| 2013/0278427 A1 | 10/2013 | Setton | |
| 2013/0289927 A1 | 10/2013 | Smith et al. | |
| 2013/0297390 A1 | 11/2013 | Jaquez et al. | |
| 2013/0298421 A1 | 11/2013 | McCallum et al. | |
| 2013/0311140 A1 | 11/2013 | Schechter | |
| 2013/0339304 A1 | 12/2013 | Lee et al. | |
| 2014/0048609 A1 | 2/2014 | Chen et al. | |
| 2014/0055346 A1 | 2/2014 | Boni et al. | |
| 2014/0074730 A1 | 3/2014 | Arensmeier et al. | |
| 2014/0097273 A1 | 4/2014 | Helms et al. | |
| 2014/0116267 A1 | 5/2014 | Hochschild, Jr. et al. | |
| 2014/0118135 A1 | 5/2014 | O'Brien et al. | |
| 2014/0141800 A1 | 5/2014 | Eum et al. | |
| 2014/0148220 A1 | 5/2014 | Park et al. | |
| 2014/0151456 A1 | 6/2014 | McCurnin et al. | |
| 2014/0188287 A1 | 7/2014 | Sabata | |
| 2014/0189443 A1 | 7/2014 | Xu et al. | |
| 2015/0105880 A1 | 4/2015 | Slupik et al. | |
| 2016/0358244 A1* | 12/2016 | Schmitz | G06Q 30/0635 |

FOREIGN PATENT DOCUMENTS

| | | |
|---|---|---|
| CN | 1657931 | 8/2005 |
| CN | 1695420 | 11/2005 |
| CN | 1949814 | 4/2007 |
| CN | 201181992 | 1/2009 |
| CN | 201218741 | 4/2009 |
| CN | 201242247 | 5/2009 |
| CN | 101539539 | 9/2009 |
| CN | 101571309 | 11/2009 |
| CN | 201357149 | 12/2009 |
| CN | 201382500 | 1/2010 |
| CN | 201392482 | 1/2010 |
| CN | 201413484 | 2/2010 |
| CN | 201414327 | 3/2010 |
| CN | 101739798 | 6/2010 |
| CN | 101763704 | 6/2010 |
| CN | 201522662 | 7/2010 |
| CN | 101803544 | 8/2010 |
| CN | 101846669 | 9/2010 |
| CN | 101847017 | 9/2010 |
| CN | 201570902 | 9/2010 |
| CN | 201622689 | 11/2010 |
| CN | 201663360 | 12/2010 |
| CN | 201689089 | 12/2010 |
| CN | 201750222 | 2/2011 |
| CN | 201752200 | 3/2011 |
| CN | 201777462 | 3/2011 |
| CN | 201796004 | 4/2011 |
| CN | 102037888 | 5/2011 |
| CN | 201837910 | 5/2011 |
| CN | 201927167 | 8/2011 |
| CN | 102223274 | 10/2011 |
| CN | 202018607 | 10/2011 |
| CN | 102252405 | 11/2011 |
| CN | 202033677 | 11/2011 |
| CN | 202058270 | 11/2011 |
| CN | 202066607 | 12/2011 |
| CN | 202067169 | 12/2011 |
| CN | 202067380 | 12/2011 |
| CN | 202093371 | 12/2011 |
| CN | 202093402 | 12/2011 |
| CN | 102313341 | 1/2012 |
| CN | 202102281 | 1/2012 |
| CN | 202121608 | 1/2012 |
| CN | 202127426 | 1/2012 |
| CN | 102359735 | 2/2012 |
| CN | 202133654 | 2/2012 |
| CN | 202141282 | 2/2012 |
| CN | 202150163 | 2/2012 |
| CN | 102385793 | 3/2012 |
| CN | 102393057 | 3/2012 |
| CN | 202162884 | 3/2012 |
| CN | 102419082 | 4/2012 |
| CN | 202188865 | 4/2012 |
| CN | 102437649 | 5/2012 |
| CN | 102495595 | 6/2012 |
| CN | 102497390 | 6/2012 |
| CN | 102507907 | 6/2012 |
| CN | 202268064 | 6/2012 |
| CN | 102550373 | 7/2012 |
| CN | 102564106 | 7/2012 |
| CN | 102568171 | 7/2012 |
| CN | 202331165 | 7/2012 |
| CN | 202339622 | 7/2012 |
| CN | 202340556 | 7/2012 |
| CN | 102628603 | 8/2012 |
| CN | 102629126 | 8/2012 |
| CN | 102662423 | 9/2012 |
| CN | 202452627 | 9/2012 |
| CN | 102715043 | 10/2012 |
| CN | 102738895 | 10/2012 |
| CN | 102749891 | 10/2012 |
| CN | 202486945 | 10/2012 |
| CN | 102792877 | 11/2012 |
| CN | 202520602 | 11/2012 |
| CN | 102832714 | 12/2012 |
| CN | 202583176 | 12/2012 |
| CN | 202600541 | 12/2012 |
| CN | 202631520 | 12/2012 |
| CN | 102865648 | 1/2013 |
| CN | 102880152 | 1/2013 |
| CN | 102886772 | 1/2013 |
| CN | 202635267 | 1/2013 |
| CN | 202649748 | 1/2013 |
| CN | 202661434 | 1/2013 |
| CN | 202661897 | 1/2013 |
| CN | 202679072 | 1/2013 |
| CN | 202692316 | 1/2013 |
| CN | 102929240 | 2/2013 |
| CN | 102945056 | 2/2013 |
| CN | 202720281 | 2/2013 |
| CN | 202728908 | 2/2013 |
| CN | 202773568 | 3/2013 |
| CN | 103048971 | 4/2013 |
| CN | 103064452 | 4/2013 |
| CN | 202854634 | 4/2013 |
| CN | 202862191 | 4/2013 |

(56) References Cited

FOREIGN PATENT DOCUMENTS

| | | |
|---|---|---|
| CN | 202870602 | 4/2013 |
| CN | 202890129 | 4/2013 |
| CN | 202903721 | 4/2013 |
| CN | 202904845 | 4/2013 |
| CN | 202907567 | 5/2013 |
| CN | 202916952 | 5/2013 |
| CN | 202948006 | 5/2013 |
| CN | 202956127 | 5/2013 |
| CN | 202956643 | 5/2013 |
| CN | 103135639 | 6/2013 |
| CN | 103141365 | 6/2013 |
| CN | 103168659 | 6/2013 |
| CN | 103179297 | 6/2013 |
| CN | 202958762 | 6/2013 |
| CN | 103197625 | 7/2013 |
| CN | 103225856 | 7/2013 |
| CN | 203037289 | 7/2013 |
| CN | 203037291 | 7/2013 |
| CN | 203054539 | 7/2013 |
| CN | 203069572 | 7/2013 |
| CN | 203083077 | 7/2013 |
| CN | 203083615 | 7/2013 |
| CN | 203087145 | 7/2013 |
| CN | 203100774 | 7/2013 |
| CN | 103234578 | 8/2013 |
| CN | 103248057 | 8/2013 |
| CN | 203117820 | 8/2013 |
| CN | 203148469 | 8/2013 |
| CN | 103297537 | 9/2013 |
| CN | 203194240 | 9/2013 |
| CN | 203217406 | 9/2013 |
| CN | 203226108 | 10/2013 |
| CN | 203250160 | 10/2013 |
| CN | 203250230 | 10/2013 |
| CN | 203274109 | 11/2013 |
| CN | 203290012 | 11/2013 |
| CN | 203366161 | 12/2013 |
| CN | 203366482 | 12/2013 |
| CN | 103488160 | 1/2014 |
| CN | 203378526 | 1/2014 |
| CN | 203396500 | 1/2014 |
| CN | 203397185 | 1/2014 |
| CN | 103548647 | 2/2014 |
| CN | 103583318 | 2/2014 |
| CN | 203455728 | 2/2014 |
| CN | 103631242 | 3/2014 |
| CN | 103644627 | 3/2014 |
| CN | 203502813 | 3/2014 |
| CN | 103699061 | 4/2014 |
| CN | 103759767 | 4/2014 |
| CN | 103760849 | 4/2014 |
| CN | 203533800 | 4/2014 |
| CN | 203561906 | 4/2014 |
| CN | 103885509 | 6/2014 |
| EP | 1083390 | 12/2002 |
| EP | 1756783 | 2/2007 |
| EP | 1817529 | 8/2007 |
| EP | 1990080 | 11/2008 |
| EP | 2016425 | 1/2009 |
| EP | 2020647 | 2/2009 |
| EP | 2157491 | 2/2010 |
| EP | 2683146 | 1/2014 |
| JP | 2003130964 | 5/2003 |
| JP | 2008146612 | 6/2008 |
| JP | 4947283 | 3/2012 |
| WO | 8704275 | 7/1987 |
| WO | 2008097005 | 8/2008 |
| WO | 2008150815 | 12/2008 |
| WO | 2008153275 | 12/2008 |
| WO | 2010043368 | 4/2010 |
| WO | 2011034302 | 3/2011 |
| WO | 2012016432 | 2/2012 |
| WO | 2013057146 | 4/2013 |
| WO | 2013166972 | 11/2013 |
| WO | 2013175741 | 11/2013 |
| WO | 2014015141 | 1/2014 |
| WO | 2014081276 | 5/2014 |
| WO | 2014101032 | 7/2014 |

OTHER PUBLICATIONS

"Sensorist—Online Wire Sensors: Hardware." URL:<http://sensorist.com/hardware> Copyright 2015, obtained from the Internet Nov. 20, 2015 (3 pages).

"Sensorist—Online Wire Sensors: Software." URL:<http://sensorist.com/software> Copyright 2015, obtained from the Internet Nov. 20, 2015 (2 pages).

"Yifang Digital SH412." URL:<http://www.yifangdigital.com/product/SH412.aspx> Copyright 2005-2011, obtained from the Internet Nov. 20, 2015 (2 pages).

"FilesThruTheAir WiFi Devices." URL:<http:www.filesthrutheair.com/wifi-devices-range> Copyright 2014, obtained from the Internet Nov. 20, 2015 (2 pages).

"Wireless Temperature Monitoring Technology, Senso Scientific." URL<http://www.sensoscientific.com/services/technology/> Jan. 4, 2012, obtained from the Internet Nov. 20, 2015 (4 pages).

"Founten Wireless Communicating Thermostat with Humidity Control (FS-STAT-32ACH)", URL:<http://www.founten.com/portfolio-view/wireless-communicating-thermostat-with-humidity-control/> Obtained from the Internet Nov. 20, 2015 (3 pages).

"Room Alert 3 Wi-Fi Temperature & Environment Monitoring", URL:<http://www.roomalert.com> Copyright 1988-2015, obtained from the Internet Nov. 20, 2015 (7 pages).

"Thermo Recorder Network Dedicated Temperature/Humidity Data Logger TR-71W and TR-72W", T&D Corporation, Apr. 2009 (4 pages).

"Real-Time Monitoring From Anywhere," Temperature Alert, URL:<http:www.temperaturealert.com> Copyright 2014, obtained from the Internet Nov. 20, 2015 (3 pages).

"Temperature@lert WiFi Edition—WiFi Temperature Monitoring Systems", URL:<http://www.temperaturealert.com/Wireless-Temperature-Store/Temperature-Alert-WiFi-Sensor.aspx> Obtained from the Internet Nov. 20, 2015 (2 pages).

"Temperature@lert Sensor Cloud", URL:<http://www.temperaturealert.com/Remote-Temperature/Sensor-Cloud.aspx> Obtained from the Internet Nov. 20, 2015 (3 pages).

"Elpro Central Monitoring Systems" URL:<http://www.elpro.com/en/solutions/central-monitoring-systems> Copyright 2014, obtained from the Internet May 29, 2014 (7 pages).

"AirQ 110 Humidity Sensor" URL:<http://www.airqnetworks.com/products/wireless-sensors/wireless-humidity-sensor> Copyright 2010-2014, obtained from the Internet Nov. 20, 2015 (4 pages).

"AirQ 111 Dual Sensor" URL:<http://www.airqnetworks.com/products/wireless-sensors/wireless-temperature-and-humidity-sensor> Copyright 2010-2014, obtained from the Internet Nov. 20, 2015 (4 pages).

"ConnectSense Wireless Temperature Sensor" URL:<https://www.connectsense.com/wireless-temperature-sensor> Copyright 2015, obtained from the Internet Nov. 20, 2015 (3 pages).

"ArtTrac Technology's Temperature, Dew Point, and Humidity Sensors" URL:<http://www.arttrac.net?p=224> Oct. 10, 2011, obtained from the Internet Nov. 20, 2015 (2 pages).

"EL-WiFi-TH WiFi Temperature & Humidity Data Logging Sensor" URL:<http://www.lascarelectronics.com/temperaturedatalogger.php?location=uk&datalogger=424> Obtained from the Internet May 29, 2014 (1 page).

"Send Data to Your Smartphone with T&D WiFi Data Loggers" CAS Data Loggers, URL:<https://www.dataloggerinc.com/content/news/product_anouncements/632/send_data_to_your_smartphone_with_tandd_wifi_data_loggers/> Nov. 18, 2013, obtained from the Internet Nov. 20, 2015 (5 pages).

"Accsense Wireless Monitoring and Alarming Systems" CAS Data Loggers, URL:<http://www.dataloggerinc.com/manufacturers/Accsense_Monitoring/3/> Copyright 2015, obtained from the Internet Nov. 20, 2015 (11 pages).

(56) References Cited

OTHER PUBLICATIONS

Elias, Andre G. F. et al. "A Ubiquitous Model for Wireless Sensor Networks Monitoring", 2012 Sixth International Conference on Innovative Mobile and Internet Services in Ubiquitous Computing, Jul. 4-6, 2012 (pp. 835-839).
"Web ID Wireless Temperature Monitoring Solutions" URL:<http://www.webidsystems.com.au/> Obtained from the Internet Nov. 20, 2015 (3 pages).
"WebIO Internet Control" URL:<http://www.webio.us/version3/> Obtained from the Internet Nov. 20, 2015 (6 pages).
"Wireless Sensor Tag System: Monitor Everything from the Internet" URL:<https://www.mytaglist.com> Copyright 2010-2014, obtained from the Internet May 29, 2014 (7 pages).
"Sensor Gateway, the base unit for the sensors" URL:<http://www.serverscheck.com/sensors/> Copyright 2003-2015, obtained from the Internet Nov. 20, 2015 (5 pages).
"Technology: Temperature Humidity Monitoring" URL:<http://cellularmachines.com/technology/> Obtained from the Internet May 29, 2014 (6 pages).
"Wireless Humidity and Temperature Monitoring and Alarming System: OM-CP-THERMALERT-RH" URL:<http://www.omega.com/pptst/OM-CP-THERMALERT-RH.html> Copyright 2003-2015, obtained from the Internet Nov. 20, 2015 (3 pages).
"Wireless Transmitter Receiver for Web-Based Process Monitoring: UWTC-REC3" URL:<http://www.omega.com/pptst/UWTC-REC3.html> Copyright 2003-2015, obtained from the Internet Nov. 20, 2015 (3 pages).
"NotifEye Humidity Sensor Model #15120" URL:<http://www.cooper-atkins.com/Products/NotifEye/Humidity_Sensor_15120/> Copyright 2009-2015, obtained from the Internet Nov. 20, 2015 (2 pages).
"Ekahua Vision™ Business Intelligence Software" URL:<http://www.ekahau.com/real-time-location-system/technology/ekahau-vision> Copyright 2015, obtained from the Internet Nov. 20, 2015 (9 pages).
"WiFi Temperature and Humidity Sensors" URL:<http://www.corintech.com/wifi-sensors> Copyright 2014, obtained from the Internet May 29, 2014 (3 pages).
"Elertus Smart Sensor Review: New Age Hygrometer", Stogie Fresh, URL:<http://www.stogiefresh.info/edu-humidors/articles/review-elertus.html> Dated Jan. 6, 2014, obtained from the Internet Nov. 20, 2015 (3 pages).
"La Crosse Remote Temperature & Humidity Monitor for Wine Cellar, Model D111.E1.BP.WI", Sylvane Inc., Copyright 2014 (5 pages).
"Humidor Alerts—Remote Sensor" URL:<http://www.canadahumidor.com/index.php?p=product&id=646&parent=8&is_print_version=true> Obtained from the Internet Apr. 30, 2014 (2 pages).
"Weather Environment System 01050C" URL:<http://www.acurite.com/acurite-professional-weather-center-with-aculink-remote-monitoring-weather-alerts-temperature-humidity-wind-rain-01055.html> Obtained from the Internet Apr. 30, 2014 (2 pages).
"Alima: The smart indoor air quality monitor for your home" URL:<https://www.indiegogo.com/projects/alima-the-smart-indoor-air-quality-monitor-for-your-home#home> Obtained from the Internet Apr. 30, 2014 (21 pages).
"Web Sensor T3510—remote hygrometer with Ethernet interface", Comet System, URL:<http://www.cometsystem.cz/products/reg-T3510> Obtained from the Internet Apr. 30, 2014 (4 pages).
Ge, Wenqing et al. "Design of Temperature and Humidity Monitoring Terminal System Based on Android", 2012 3rd International Conference on System Science, Engineering Design and Manufacturing Informatization, Oct. 20-21, 2012 (pp. 98-100).
Environmental Guidelines for the Storage of Paper Records, http://www.niso.org/publications/tr/tr01.pdf, William K. Wilson (Year: 1995).
https://www.acurite.com/learn/case-study/how-acurite-helps-musicians-preserve-vintage-instruments.
International Search Report and Written Opinion for related PCT Application PCT/US2016/036006, dated Oct. 7, 2016 (15 pages).
Desiccant Technology for HVAC Applications, Andrew Lowenstein, PhD, Apr. 16, 2008.
International Search Report and Written Opinion for related PCT Application PCT/US2019/044798, dated Nov. 5, 2019 (13 pages).

\* cited by examiner

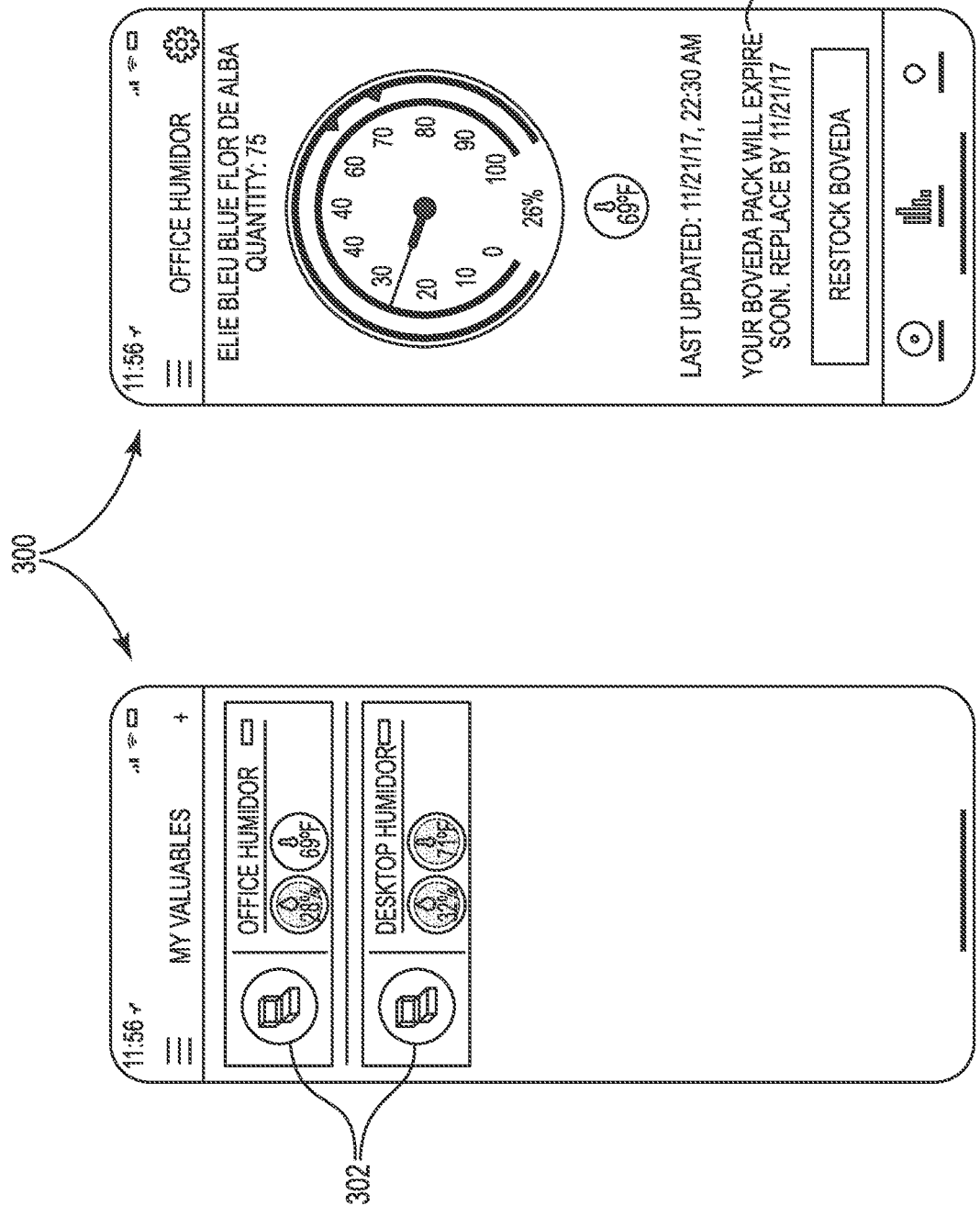

SYSTEMS, METHODS AND DEVICES FOR CONTROLLING HUMIDITY IN A CLOSED ENVIRONMENT WITH AUTOMATIC AND PREDICTIVE IDENTIFICATION, PURCHASE AND REPLACEMENT OF OPTIMAL HUMIDITY CONTROLLER

CROSS-REFERENCE TO RELATED APPLICATIONS

The present application is a Continuation-in-Part of U.S. patent application Ser. No. 14/732,079, entitled Systems, Methods and Devices for Controlling Humidity in a Closed Environment with Automatic and Predictive Identification, Purchase and Replacement of Optimal Humidity Controller, and filed Jun. 5, 2015, the content of which is hereby incorporated by reference herein in its entirety.

FIELD OF THE INVENTION

The present disclosure relates to systems and methods for controlling and monitoring humidity within a closed environment. Particularly, the present disclosure relates to systems and methods for selecting and ordering an optimal humidity controller for seasoning a container prior to storing an asset, and/or for controlling a relative humidity within the container. More particularly, the present disclosure relates to systems and methods for selecting an optimal humidity controller, predicting when a new humidity controller will be needed, selecting a new humidity controller, and automatically ordering the new humidity controller.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor implicitly admitted as prior art against the present disclosure.

Closed environments such as storage cases for instruments, particularly stringed instruments, cigars, other tobacco products, *cannabis*, specialty herbal products, and other uses may require controlling of the relative humidity levels within the closed environments to optimally maintain the assets stored or housed therein. For example, herbal products such as *cannabis* generally require a unique series of drying and curing steps, and thus it is important that the atmosphere adjacent to the products be maintained at a desired atmospheric condition in order to maintain quality and integrity of the products. In the case of musical instruments, atmospheric humidity can affect the lifespan and sound quality for stringed instruments. The absence of optimal humidity levels can lead to swelling, splits, cracks, decay, checking, movement in joins and general distortion of materials susceptible to too much or too little humidity. Similarly, too much or too little atmospheric humidity can adversely affect the quality and/or lifespan of stored cigars or other tobacco products. Moreover, too much humidity can result in the growth of microorganisms, which can be toxic. With respect to tobacco or *cannabis* products, too little humidity can result in a perceived poor quality of burn and a reduced economic value. Thus, humidors are provided to assist in maintaining not only humidity levels, but also temperature levels, within a desired range.

In general, "seasoning" is a process of preparing products for use, for a particular use, or for use in a particular environment. For example, pots, pans, woks, griddles, and other cooking surfaces, such as those made of cast iron or similar materials, may be seasoned prior to use. Seasoning in this regard generally coats the porous metal cooking surface with a polymerized oil or fat, forming a protective barrier against oxidation of the metal. Such cast iron seasoning typically involves coating the cooking surface with oil(s) or fat(s), and heating the cooking surface to polymerize the oil(s) or fat(s) on the cooking surface.

Other materials or products may be seasoned as well. For example, lumber or timber may be seasoned prior to use in construction or as firewood. In this regard, seasoning of lumber or timber generally includes drying the lumber or timber to remove excess moisture prior to use.

The materials used to construct storage cases, such as storage cases for musical instruments, cigars, other tobacco products, *cannabis*, specialty herbal products, or other assets, may affect the relative humidity within the storage case. That is, the moisture or dryness level of the materials from which the container is constructed may tend to affect the relative humidity within the enclosure. For example, a cigar humidor may be constructed of wood. The wood may be relatively dry compared to the humidity desired for cigar storage, and thus the container wood may tend to pull humidity out of the enclosed space and/or out of the cigars. This can harm the quality and/or life of the cigars. Similarly, other assets that may benefit from storage in a controlled humidity environment may be harmed where the container affects the relative humidity within the enclosure.

Thus, there is a need in the art for systems and methods for adjusting humidity of an enclosure to be used to store an asset at a desired or optimal humidity level. In particular, there is a need for systems and methods for adjusting the moisture mass of a container in order to season the container for storing an asset. More particularly, there is a need in the art for systems and methods for selecting an optimal humidity controller for seasoning, monitoring the seasoning process, predicting the need for a new humidity controller, and automatically ordering a new humidity controller.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

The present disclosure, in one or more embodiments, relates to a method for seasoning a container for storing an asset. The method may include the steps of determining, using a humidity sensor, a humidity condition outside the container and, using the same humidity sensor, determining a humidity condition inside the container. The method may additionally include determining at least one dimension of the container, determining a desired humidity level, and, based on the humidity conditions, dimension, and desired humidity level, identifying a humidity controller for seasoning the container. The method may additionally include recommending the identified humidity controller. The at least one dimension may be an outer dimension, an inner dimension, or a thickness. The method may additionally include determining a material of the container. Moreover, determining a dimension of the container may include receiving a measurement input. In other embodiments, determining a dimension of the container may include receiving a photograph of the container and extracting a dimension from the photograph. The desired humidity level may be an optimal humidity level for an asset to be stored in the container, which may be determined by accessing a lookup table. In some embodiments, the method may include monitoring a humidity condition in the container during the seasoning using the humidity controller. Moreover, the method may include generating a notification when seasoning is substantially complete. The method may further include identifying, based on the desired humidity level, a suitable humidity controller for maintaining the desired humidity level within the container and recommending the identified suitable humidity controller.

The present disclosure, in one or more embodiments, additionally relates to a system for seasoning a container for storing an asset. The system may include a humidity sensor configured for sensing a relative humidity and a database. The database may store humidity data sensed by the humidity sensor and a lookup table comprising optimal humidity levels for the asset. The system may have a processor encoded with computer-readable instructions to determine, using the humidity sensor, a humidity condition outside the container. The processor may further have instructions to, using the humidity sensor, determine a humidity condition inside the container. The instructions may further include determining at least one dimension of the container and determining a desired humidity level. The instructions may further include, based on the humidity conditions, dimension, and desired humidity level, identifying a humidity controller for seasoning the container, and recommending the identified humidity controller. The system may include a user interface in wireless communication with the processor and configured to display the recommendation. In some embodiments, the processor may further be encoded with instructions to identify, based on the desired humidity level, a suitable humidity controller for maintaining the container at the desired humidity level. The instructions may further include recommending the identified suitable humidity controller. The at least one dimension may include an outer dimension, an inner dimension, or a thickness. In some embodiments, determining the dimension may include receiving a measurement input. In other embodiments, determining the dimension may include receiving a photograph of the container and extracting the dimension from the photograph. The desired humidity level may be an optimal humidity level for an asset to be stored in the container, which may be determined by accessing a lookup table.

The present disclosure, in one or more embodiments, additionally relates to a system for ordering a humidity controller for a container storing an asset. The system may include a humidity sensor configured for sensing a relative humidity and a database. The database may store humidity data sensed by the humidity sensor, asset information, and container information. The system may have a computer device having a user interface and further having a monitoring module for monitoring a humidity level in the container. The computing device may have a recommendations module for recommending, based on the humidity data, asset information, and container information, a humidity controller for the container. The computing device may further have an ordering module or order the recommended humidity controller. In some embodiments, the recommended humidity controller may be for seasoning the container. In other embodiments, the recommended humidity controller may be for maintaining a desired humidity level in the container.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE SEVERAL VIEWS OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

FIG. 3A is a screenshot of a user interface of the present disclosure, showing data for multiple enclosures, according to one or more embodiments.

FIG. 3B is a screenshot of a user interface of the present disclosure, showing detailed information for an enclosure, according to one or more embodiments.

DETAILED DESCRIPTION OF THE INVENTION

Figure 1A:
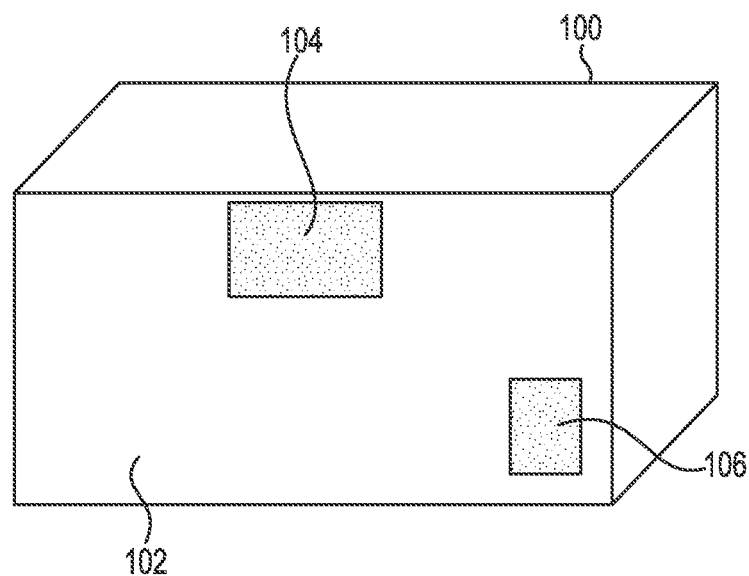
FIG. 1A is a schematic diagram of a container having a humidity sensor and humidity controller, according to one or more embodiments of the present invention.

The description of the invention and its applications as set forth herein are illustrative and are not intended to limit the scope of the invention. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

The present disclosure relates to systems and methods for determining an optimal humidity controller for a container defining a closed environment. In particular, in some embodiments, the present disclosure relates to systems and methods for determining an optimal humidity controller for seasoning the container prior to storing an asset. Seasoning the container may include the use of one or more humidity controllers to add or remove moisture to the material of the container. Seasoning the container before it is used to store an asset may help ensure that the materials of the container do not draw excess moisture away from the closed environment, sometimes referred to as dehumidification, or add excess moisture to the closed environment, sometimes referred to as humidification. Seasoning may additionally help ensure that the container seals or closes properly. Ultimately, seasoning a container before it is used to store an asset may help ensure that an optimal humidity level may be maintained within the closed environment, and may thus help to preserve quality of the asset.

An optimal humidity controller for seasoning a container may be selected or identified based upon a variety of measurable variables. For example, selection of an optimal humidity controller may be based, at least in part, upon one or more dimensions of the container including but not limited to thickness of the container walls, a volume of the container, materials of the container, a moisture mass of the container materials, a dry mass of the container materials, a relative humidity inside the container, and/or a relative humidity outside the container. Additionally, optimal humidity controller(s) for seasoning may be based upon a desired or optimal relative humidity to be maintained within the container, such as an optimal relative humidity for the asset to be stored in the container. For example, an optimal humidity controller for seasoning may be selected by determining an optimal moisture mass for the container walls suitable for maintaining a desired relative humidity within the container. The optimal moisture mass or moisture mass range may be determined using a moisture absorption isotherm for the wall material(s) of the container. A difference between current moisture mass of the container material and desired moisture mass may help determine an optimal humidity controller for seasoning the container, for example. In some embodiments, a desired timeframe for completing the seasoning process may be considered in making a recommendation. In other embodiments, other variables and methods may be used to determine an optimal humidity controller for seasoning a container.

During the seasoning process, a humidity condition of the material or within the container environment may be monitored. For example, one or more humidity sensors may be arranged within, or attached to an inside surface of, the container in order to monitor humidity levels. Humidity levels may be monitored continuously, intermittently, at intervals, on demand, or at other suitable times. Moreover, sensed humidity data may be transmitted or otherwise communicated to a remote database and/or remote humidity analysis platform analyzing the humidity data.

In some embodiments, the sensed humidity data may be used to monitor or estimate the timing of the seasoning process, or to estimate when seasoning may be completed or nearly completed. In some embodiments, one or more moisture transport or diffusion models may be used to estimate the completion or near completion of the seasoning process. For example, a Fickian diffusion model, non-linear diffusion model, and/or other model may be used.

Once seasoning is complete, an asset may be stored in the seasoned container, and one or more humidity controllers may be used to control humidity within the container. For example, one or more two-way humidity controllers may be used to maintain a humidity level within the closed environment storing the asset at a desired or suitable humidity level or humidity range. In some embodiments, the humidity controllers(s) for controlling humidity in the environment may be selected based upon one or more variables. For example, a recommendation for a humidity controller for maintaining a desired rh in the closed environment may be based upon any or all of the variables discussed above with respect to seasoning, and may additionally be based upon the particular asset or asset type to be stored. The recommendation may additionally be based upon a history of sensed humidity data for the container and any detected leakage, for example.

Humidity controllers for seasoning the container and/or for maintaining a desired relative humidity within the container may be selected and/or ordered automatically. For example, before seasoning is complete, one or more humidity controllers for controlling humidity within the closed environment may be identified and ordered, such that the humidity controllers may be delivered prior to, or around the time of, completion of the seasoning process. Similarly, relative humidity may be monitored within the container, such that prior to an end of life of a humidity controller currently in use, a replacement humidity controller may be automatically ordered. The replacement humidity controller may be the same type of controller as the controller currently in use, or may be a different controller selected based upon any, any combination of, or all of the above described variables. The end of useful life for a current humidity controller may be predicted based upon computer modeling using any of the above described variables, based on monitored humidity data, or other information. Additionally or alternatively, machine learning methods may be used. In some embodiments, the end of life of a humidity controller may occur when the evaporation rate of the humidity controller no longer can match the rate of moisture loss due to leakage through seams, seals, and/or walls of the container. In some embodiments, the end of life of a humidity controller may occur when the absorption rate of the humidity controller can no longer match the rate of moisture leaking into the closed environment through seams, seals, and/or walls of the container. In this way, an end of useful life may be predicted, at least in part, by container leakage measurements, calculations, determinations, or estimations. End of useful life may occur, in some embodiments, when a humidity controller has dried out or absorbed its maximum capacity.

Turning now to FIG. 1A, a container 100 of the present disclosure is shown, according to one or more embodiments. The container 100 may define an enclosed space or a closed environment 102. The container 100 may have any suitable size and shape configured for storing a particular asset. For example, in some embodiments, the container 100 may be a humidor, having a size and shape configured for storing one or more cigars or other tobacco products. In some embodiments, the container 100 may be sized and shaped for storing *cannabis* products, such as one or more rolled *cannabis* products or loose *cannabis*. In other embodiments, the container 100 may be sized and shaped for storing a food product, herbal product, medicinal product, or other asset. The container 100 may generally have a rectangular, square, or cylindrical shape in some embodiments. In other embodiments, the container 100 may have any other suitable shape. For example, in some embodiments, the container 100 may be sized and shaped to store an instrument, such as a guitar, violin, viola, cello, banjo, or other instrument. In still other embodiments, the container 100 may have a shape and size configured for storing any other asset. Additionally, the container 100 may be constructed of any suitable materials. In some embodiments, the container 100 may be constructed of, or primarily of, wood. In other embodiments, the container 100 may be constructed of, or primarily of, fiberglass, glass, plastic, glass, paper, metal, and/or any other suitable materials or combination of materials.

The container 100 may close using any suitable mechanism. For example, in some embodiments, the container 100 may have a lid or top portion configured to be arranged over an opening in the container, such as a top opening. The lid or top portion may be configured to engage one or more sides of the container 100 using threading, friction fit, tongue and groove, and/or any other suitable closure mechanism.

The air within the closed environment 102 may be comprised generally of atmospheric air, similar to the air surrounding an exterior of the container 100. However, in some embodiments, a deoxygenated gas may be used, such as but not limited to nitrogen, carbon dioxide, argon, helium, or combinations thereof. In some embodiments, a positive or negative pressure differential may be present between the closed environment 102 and an external environment surrounding an outside of the container 100.

In some embodiments, the container 100 may be seasoned prior to storing an asset. For example, a humidity controller 104, which may be a seasoning humidity controller, may be arranged within the closed environment 102. The seasoning humidity controller 104 may be, for example, a salt-based, polyol-based, or glucose-based solid, liquid, or gel product allowing for one way or two-way humidity control. In some embodiments, the humidity controller 104 may be or include a pouch formed of a gas permeable, but liquid impermeable material, with the humidity control agent arranged or sealed within the pouch. In some embodiments, the pouch may be formed of layers of material, which may include a liquid impermeable but gas permeable layer. The humidity control agent may be comprised of a solid, a dispersion, an emulsion, a gel, or a saturated or unsaturated aqueous solution comprised of a salt, sugar, polyol such as glycerin or propylene glycol, mannitol, sorbitol, xylitol, amino acid, or other solute modulating the relative humidity. For example, in some embodiments, the humidity control agent may be or include a saturated or unsaturated salt solution, such as those described in U.S. Pat. No. 9,750,811, entitled Devices and Methods for Controlling Headspace Humidity and Oxygen Levels, filed Sep. 15, 2015; U.S. Pat. No. 5,936,178, entitled Humidity Control Device, filed Jun. 10, 1997; and/or U.S. Pat. No. 6,921,026, entitled Preservation of Intermediate Moisture Foods by Controlling Humidity and Inhibition of Mold Growth, filed Feb. 5, 2002, the content of each of which is hereby incorporated herein by reference in its entirety. In other embodiments, other suitable materials for controlling humidity may be used as the humidity control agent. The humidity control agent may allow for one-way or two-way humidity control in some embodiments. That is, the humidity control agent may be configured to remove moisture from the air and/or to add moisture to the air. In some embodiments, one or more additives may be combined with the humidity control agent, including but not limited to the additives described in U.S. patent application Ser. No. 14/854,159, U.S. Pat. No. 5,936,178, and/or U.S. Pat. No. 6,921,026. For example, some additives may be used to increase or otherwise control viscosity levels of the humidity control agent. One example of an additive may be one or more gums for thickening or altering viscosity of the humidity control agent. For example, in some embodiments, between approximately 0.20% and approximately 3% of the humidity control agent may comprise one or more gums. Other additives may include one or more salts, water, and/or other additives. In still other embodiments, other types of humidity controllers or humidity control systems may be used, such as one or more active humidity controllers. In some embodiments, a first humidity controller type may be used as a primary humidity controller and a second humidity controller type may be used as a secondary humidity controller.

In some embodiments, the humidity controller 104 may be, or may include components of, a humidity control device described in any of; U.S. Pat. No. 8,748,723, entitled Humidity Control System for Wood Products, and filed Mar. 14, 2013; U.S. Pat. No. 6,209,717, entitled Humidity Control System for Musical Instruments, and filed Nov. 3, 1997; and U.S. application Ser. No. 15/782,363, entitled Device for Controlling Headspace Humidity and Methods for Making the Same, and filed Oct. 12, 2017, the content of each of which is hereby incorporated by reference herein in its entirety.

A humidity sensor 106 may be a wired or wireless sensor configured to sense a humidity or moisture condition. In some embodiments, the humidity sensor 106 may be configured to sense a relative humidity within the closed environment 102. In other embodiments, the sensor 106 may sense a moisture mass of the container, or a different moisture or humidity condition. The sensor 106 may be configured to sense humidity continuously, periodically, intermittently, randomly, at intervals, and/or on demand. In some embodiments, the sensor 106 may additionally sense a temperature of the environment and/or other properties of the environment. The sensor 106 may be configured to send sensed humidity data to a database for storage, to a processor and/or server for analysis, to a user device, and/or to another system or computing device. In some embodiments, the sensor 106 may be a relatively small, wireless device. In one embodiment, the sensor 106 may be a Boveda Smart Sensor (Humidity, Temperature, and Impact sensor), available from Boveda, Inc., Minnetonka, Minn. Additionally or alternatively, the humidity sensor 106 or another humidity sensor may be configured to sense a humidity in the material of the container 100.

Each of the humidity controller 104 and sensor 106 may be suitably arranged within the closed environment 102. For example, in some embodiments, the container 100 may have an opening, pouch, slot, or other compartment for receiving the humidity controller 104 and/or the humidity sensor 106. In other embodiments, the humidity sensor 106 and/or controller 104 may be configured to be removably or fixedly secured to an interior portion or surface of the container 100. For example, the container 100 may be a humidor having a compartment or slot arranged on or in a lid or covering and configured for receiving one or more humidity controllers 104 and/or the humidity sensor 106. In another embodiment, the container 100 may have a pocket or pouch coupled to an inner side surface or bottom surface for receiving the humidity controller 104 and/or sensor 106. In other embodiments, the humidity controller 104 and/or sensor 106 may have an adhesive surface for coupling to an inner wall or surface of the container 100. In still other embodiments, the humidity controller 104 and/or sensor 106 may simply be placed within the closed environment 102 at a suitable location or position.

Figure 1B:
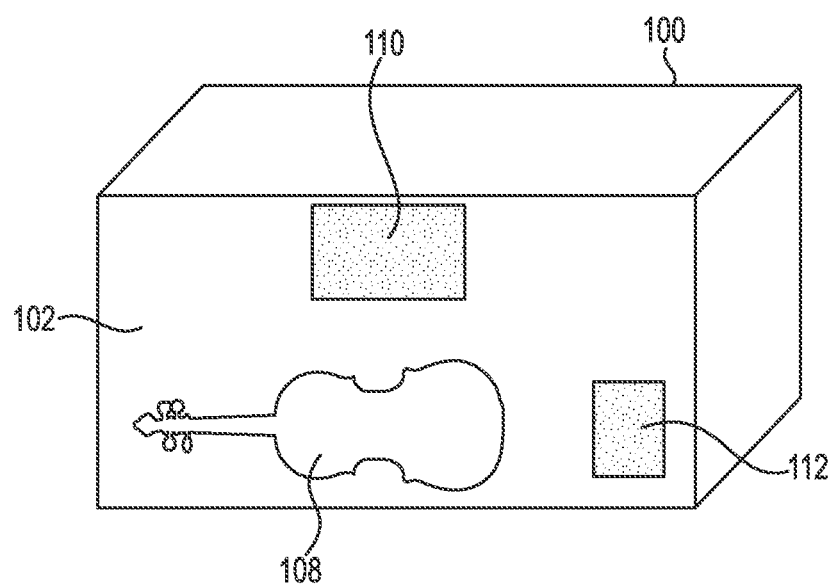
FIG. 1B is a schematic diagram of a container having a humidity sensor, humidity controller, and an asset, according to one or more embodiments of the present disclosure.

Once the container is seasoned, or otherwise prepared to store or house an asset, the asset may be arranged within the container. FIG. 1B shows an embodiment of a container 100 defining a closed environment 102. An asset 108 may be arranged within the closed environment. The asset 108 may be an asset that may generally benefit from being stored at a particular humidity level or humidity range. The asset 108 may be, for example, a musical instrument such as a wooden musical instrument. In other embodiments, the asset 108 may be one or a plurality of cigars or cigarettes, loose tobacco, or any other tobacco product. In other embodiments, the asset 108 may be a *cannabis* product or a plurality of *cannabis* products, such as loose *cannabis* or rolled *cannabis* product(s). In still other embodiments, the asset 108 may be a food product, herbal product, medicinal product, and/or any other product that may generally benefit from being stored at a particular humidity level or range.

It may be desirable to maintain a desired or optimal humidity level within the closed environment 102 storing the asset 108. For example, a humidity controller 110 may be used to maintain a desired or optimal relative humidity within the closed environment 102. That is, while the humidity controller 104, described above, may be configured to season the container 100, the humidity controller 110 may be configured to maintain a relative humidity within the closed environment 102. The humidity controller 110 may be similar to the humidity controller 104 in some embodiments. For example, the humidity controller 110 may be a salt-based or glucose-based solid, liquid, or gel product allowing for one way or two-way humidity control. As described above, the humidity controller 110 may be or include a pouch formed of a gas permeable but liquid impermeable material, with the humidity control agent arranged or sealed within the pouch. The humidity control agent may be, or may be similar to, those described above with respect to the seasoning humidity controller 104. In some embodiments, the humidity controller 110 may be configured to control the relative humidity within the closed environment 102 in the general range of 40% to 85%. The humidity controller 110 may be arranged on or in the asset 108 itself. For example, where the asset 108 is a guitar, the humidity controller 110 may be arranged within the sound hole of the guitar. In other embodiments, as described above, the humidity controller 110 may be arranged generally within the closed environment 102, or removably or fixedly coupled to an inner surface of the container 100.

A humidity sensor 112, which may be the same humidity sensor as sensor 106 or a different sensor, may monitor a humidity level, such as the relative humidity, within the closed environment 102 while the asset 108 is stored or housed therein. The humidity sensor 112 may be a wired or wireless sensor configured to sense a humidity, such as a relative humidity, within the closed environment 102. The humidity sensor 112 may be configured to sense humidity continuously, periodically, intermittently, randomly, and/or on demand. In some embodiments, the sensor 112 may additionally sense a temperature of the environment and/or other properties of the environment. The sensor 112 may be configured to send sensed humidity data to a database for storage, to a processor and/or server for analysis, to a user device, and/or to another system or computing device. In some embodiments, the sensor 112 may be a relatively small, wireless device. In one embodiment, the sensor 112 may be a Boveda Smart Sensor (Humidity, Temperature, and Impact sensor), available from Boveda, Inc., Minnetonka, Minn. The humidity sensor 112 may be arranged on or in the asset 108 itself. For example, where the asset 108 is a guitar, the humidity sensor 112 may be arranged within the sound hole of the guitar. In other embodiments, as described above, the humidity sensor 112 may be arranged generally within the closed environment 102, or removably or fixedly coupled to an inner surface of the container 100.

Figure 2:
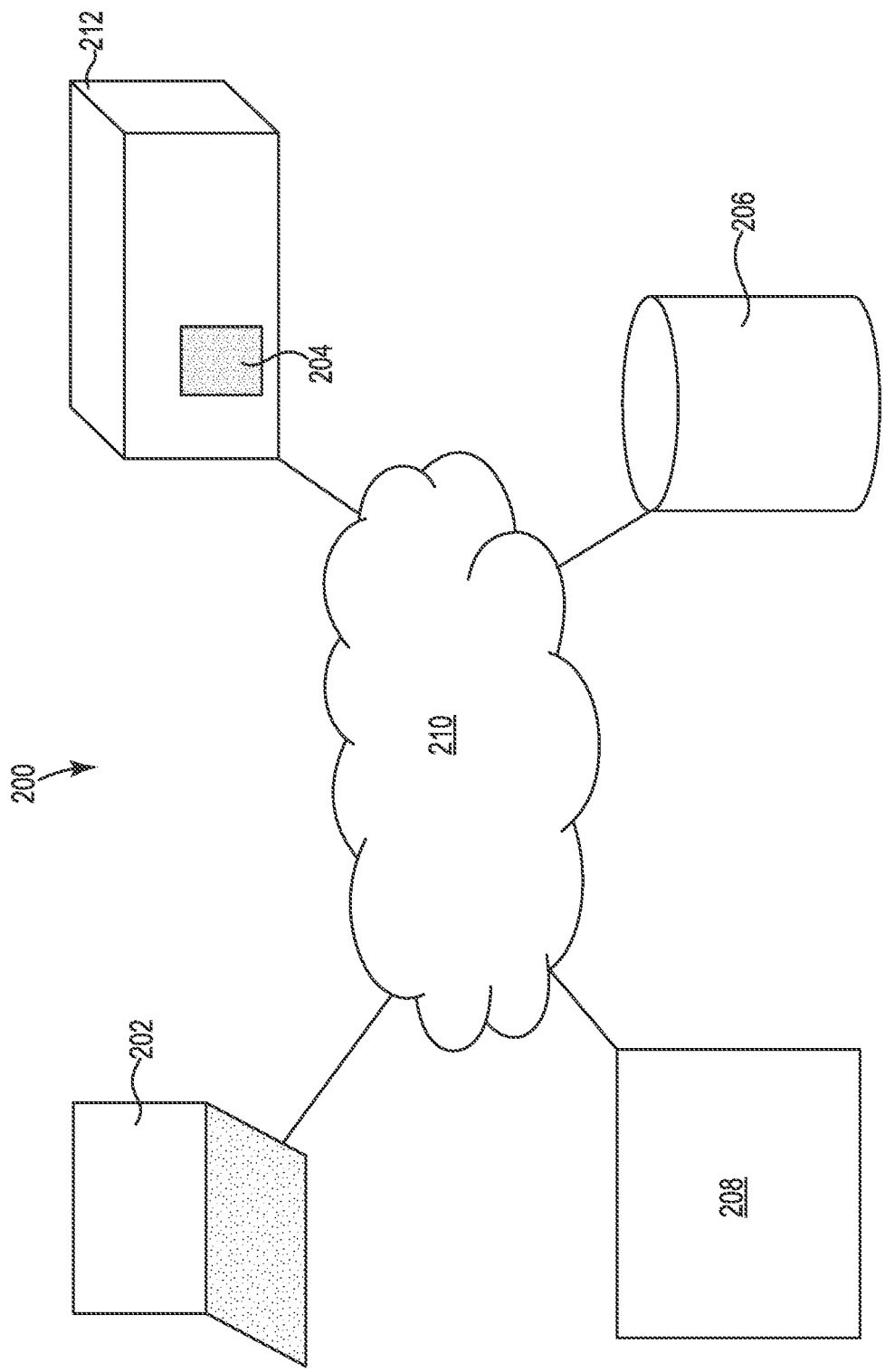
FIG. 2 is a schematic diagram of a system of the present disclosure, according to one or more embodiments.

FIG. 2 shows one embodiment of a system 200 of the present disclosure for monitoring a humidity level of a container 212 and/or for determining an optimal humidity controller for the container. As shown, the system 200 may generally include a user interface 202, a sensor 204, a database 206, and a humidity analysis platform 208. The user interface 202, sensor 204, database 206, and humidity analysis platform 208 may communicate over one or more wired or wireless networks 210.

The user interface 202 may be or include a smartphone, tablet computer, laptop computer, desktop computer, smartwatch, and or other computing device. The user interface 202 may generally provide a portal through which a user may access the database and processor. The user interface 202 may provide an application or program interface. Moreover, the user interface 202 may provide alerts and/or recommendations to a user.

Figure 3D:
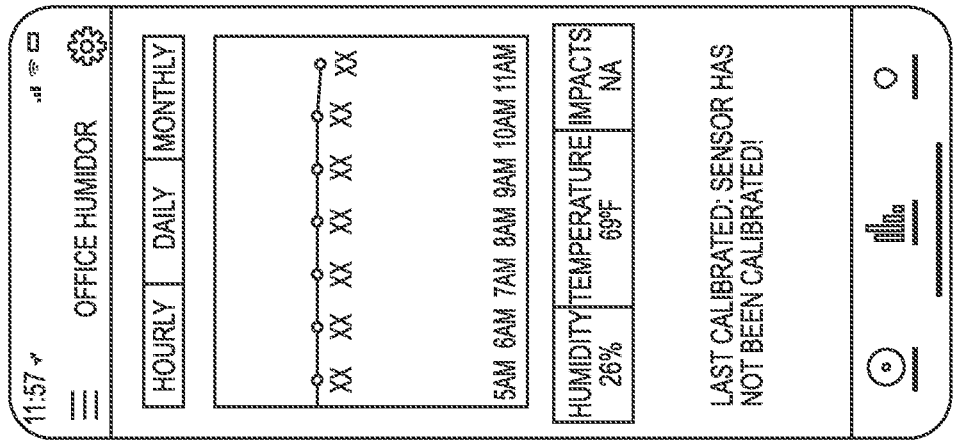
FIG. 3D is a screenshot of a user interface of the present disclosure, showing hourly temperature trend data for an enclosure, according to one or more embodiments.
Figure 3C:
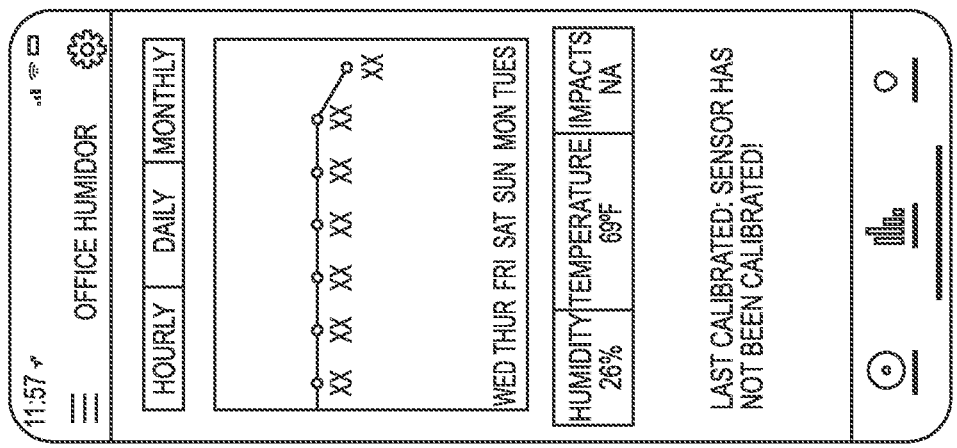
FIG. 3C is a screenshot of a user interface of the present disclosure, showing daily humidity trend data for an enclosure, according to one or more embodiments.
Figure 3E:
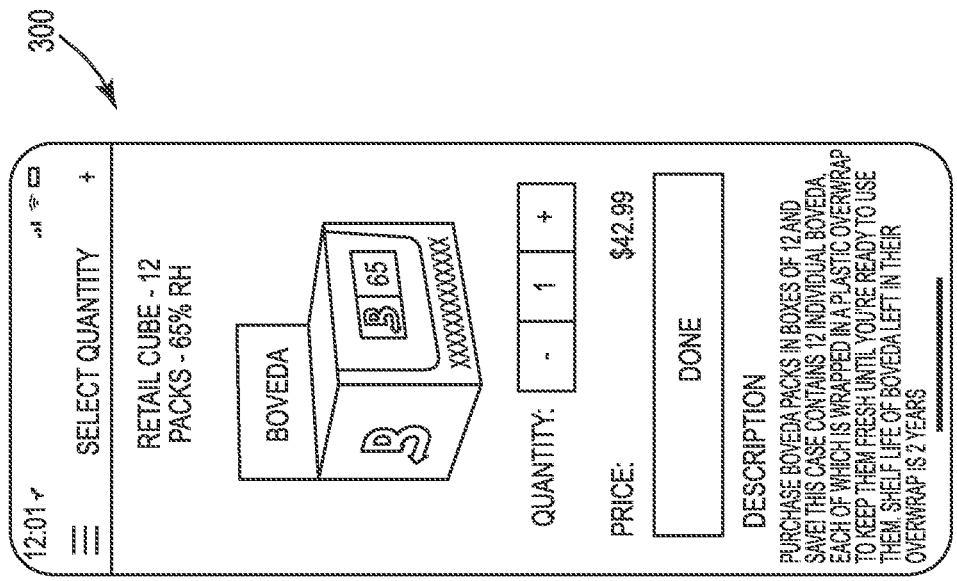
FIG. 3E is a screenshot of a user interface of the present disclosure, showing an ordering screen, according to one or more embodiments.

FIGS. 3A-3E show some examples of a user interface 300, according to one or more embodiments. As shown in FIGS. 3A and 3B, for example, the user interface 300 may provide readily accessible information related to one or more enclosures 302. Such readily accessible information may include information sensed by one or more sensors, such as humidity data and temperature data. As shown particularly in FIG. 3B, the user interface 300 may provide alert information 304, such as an alert as to an expected end of life of a humidity controller. The user interface 300 may provide other alerts as well. As shown in FIGS. 3C and 3D, the user interface 300 may provide historical humidity, temperature, and/or other enclosure data. For example, a user may view hourly, daily, or monthly humidity data and/or temperature data trends. As additionally shown in FIGS. 3C and 3D, the user interface 300 may provide information related to sensor calibration. As shown in FIG. 3E, the user interface 300 may allow a user to purchase a humidity controller.

With reference back to FIG. 2, the sensor 204 may be configured to sense humidity within an environment. The sensor 204 may be configured to be arranged in a container 212. As described above, the sensor 204 may be configured to sense humidity data continuously, periodically, intermittently, randomly, and/or on demand. In some embodiments, the sensor 204 may additionally sense a temperature of the environment and/or other properties of the environment. The sensor 204 may send sensed humidity data to the database 206 for storage and/or to the humidity analysis platform 208 for analysis. The sensed humidity data may be sent as it is collected, or may be sent according to any suitable schedule. In one particular embodiment, the sensor 204 may be a relatively small, wireless device. The sensor 204 may be configured to be easily arranged within and removed from the container 212. In some embodiments, the sensor 204 may be configured to sense a humidity of a material.

The database 206 may store data sensed by the sensor 204. Additionally, the database 206 may store data related to the container 212, such as dimensions, size, type, materials, and/or other container information. The database 206 may also store information related to an asset to be housed or stored within the container 212, such as asset type, size, number of units, serial numbers, and/or other asset information. The database 206 may additionally store information related to a desired or optimal humidity level for the asset. In some embodiments, the database 206 may store one or more lookup tables for determining a desired or optimal humidity level or humidity controller for seasoning a container and/or for maintaining a humidity level. For example, in some embodiments, a lookup table may include a listing of suitable or optimal humidity levels for a plurality of assets, asset types, enclosures, enclosure types, enclosure sizes, and/or other asset or enclosure parameters. Additionally or alternatively, a lookup table may include a listing of suitable or optimal humidity controllers or controller types for a plurality of assets, asset types, enclosures, enclosure types, enclosure sizes, and/or other asset or enclosure parameters. In some embodiments, such lookup table(s) may be dynamically generated and/or updated based data input received from a user, a sensor, or from another source. The database 206 may be a local or remote database, and in some embodiments may include cloud-based storage. The database 206 may include multiple storage devices and/or types in some embodiments.

The humidity analysis platform 208 may generally have hardware and/or software for performing the various method steps described herein, including monitoring humidity levels via the sensor 204, determining optimal humidity levels, recommending humidity controllers, and/or ordering humidity controllers. In some embodiments, the humidity analysis platform 208 may have a monitoring module, a recommendations module, and an ordering module. In other embodiments, the humidity analysis platform may have additional or alternative modules or other components.

The monitoring module may be configured to control when the sensor 204 senses or collects data, and/or may be configured to store sensed data. The monitoring module may additionally determine when a humidity controller, such as a replacement humidity controller, may be needed. For example, the monitoring module may analyze sensed humidity data to determine that a humidity controller may be nearing the end of its useful life. In a particular embodiment, a downward trend in sensed humidity may reveal that a humidity controller is nearing the end of its useful life. In another particular embodiment, the monitoring module may determine that a humidity controller is nearing the end of its useful life based on the length of time the humidity controller has been controlling humidity within the container. The monitoring module may determine when replacement controller(s) should be ordered such that the new humidity controllers. Moreover, the monitoring module may monitor container seasoning operations to determine when a seasoning process may be complete or substantially complete.

The recommendations module may be configured to analyze humidity data, container data, asset data, and/or other data to make recommendations for type and/or number of humidity controllers. The recommendations module may make recommendations with respect to humidity controllers for controlling humidity to season a container and/or to maintain a desired or optimal relative humidity level within a previously seasoned container. Recommendations may be made based on accessing one or more lookup tables stored in the database 206. In some embodiments, recommendations may be made, at least in part, based on calculations.

For example, in some embodiments, a recommendation for an optimal humidity controller for seasoning a container may be based, at least in part, upon a container material type, dry mass of the container, desired relative humidity, desired seasoning timespan, container air volume, wall thickness, and/or material mass. Optimal humidity controller recommendations may additionally include a consideration of how much moisture is currently within the container walls (i.e., moisture mass) and/or a current relative humidity of the air inside and outside the container. In some embodiments, the recommendations module may determine or calculate an optimal amount of moisture mass for the container material or container walls needed in order to maintain a suitable or desired humidity level within the container. This may be based, at least in part, on the container material and/or one or more container dimensions. A difference between current moisture mass of the container material and desired moisture mass may help determine an optimal humidity controller for seasoning the container, for example. In other embodiments, other variables may be used to determine an optimal humidity controller for seasoning a container.

Similarly, in some embodiments, a recommendation for an optimal humidity controller for maintaining a desired relative humidity within the container, such as after seasoning, may include a consideration of any or all of the same variables. Additionally, in recommending an optimal humidity controller for maintaining a relative humidity, the recommendations module may consider the particular asset, or type of asset, to be housed in the container. For example, some assets may benefit from a higher or lower relative humidity range than other assets. In some embodiments, a recommendation may additionally include a consideration of any sensed or anticipated leakage of the container. In this way, it is to be appreciated that a selection of an optimal humidity controller for maintaining a relative humidity within the container to store an asset may be based on the asset as well as on the container itself.

In some embodiments, the ordering module may be configured to automatically place an order for recommended humidity controllers. In other embodiments, the ordering module may allow a user to authorize an order of recommended humidity controllers, verify a selection of one or more humidity controllers, and/or may allow the user to otherwise make or finalize the order of one or more humidity controllers. The ordering module may access stored payment information and/or stored address information for the user to cause the recommended humidity controllers to be delivered to the user's preferred address.

It is to be appreciated that, in some embodiments, the humidity analysis platform, or components thereof, may be combined with the sensor. That is, the sensor device may have software encoded thereon for the monitoring module, recommendations module, and/or ordering module. In some embodiments, the sensor device may additionally store sensed humidity data. In this way, it is to be appreciated that multiple components of the system may be embodied in the humidity sensing device arranged within the container.

Figure 4:
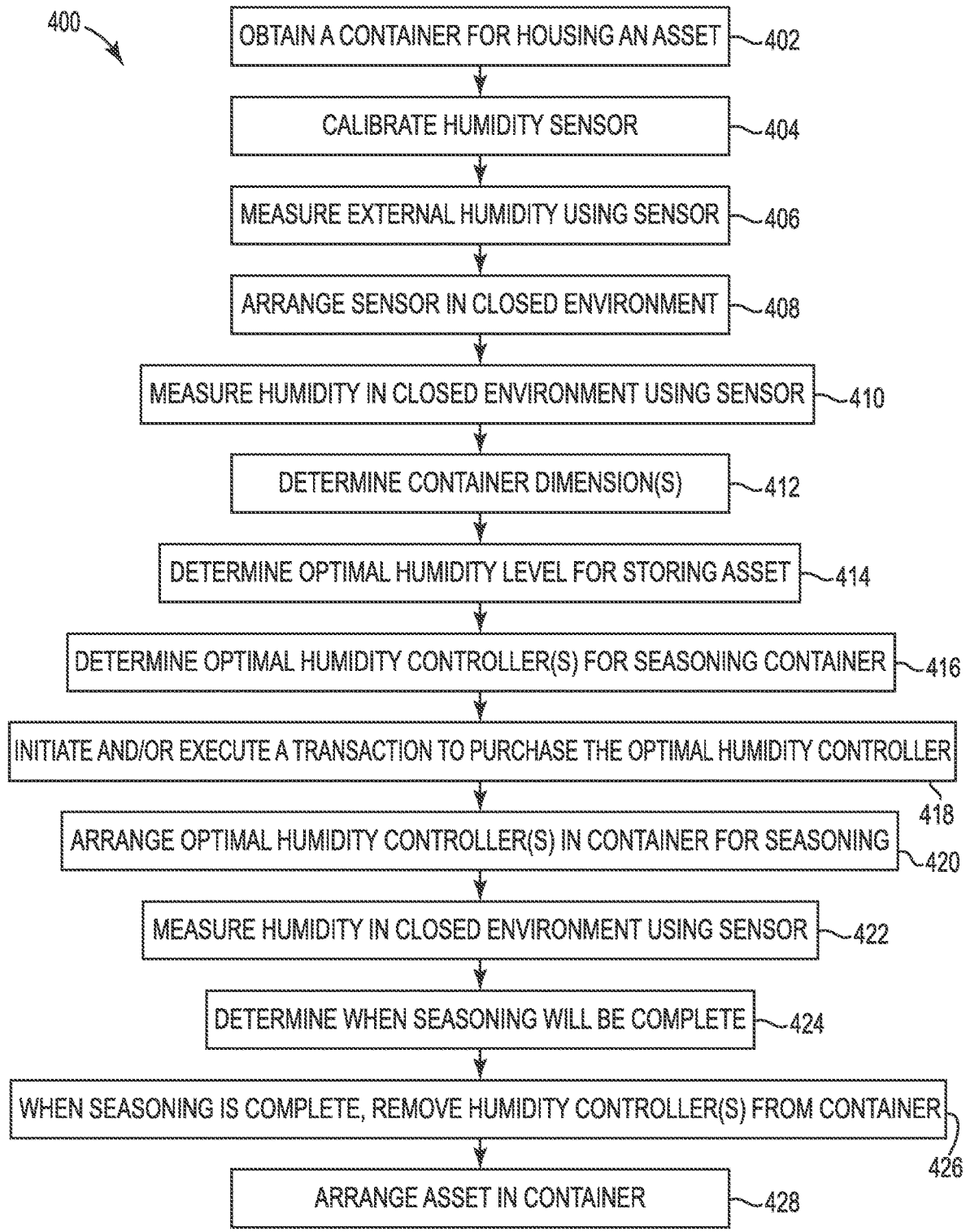
FIG. 4 is a flow diagram of a method of monitoring a seasoning process for a container, according to one or more embodiments of the present disclosure.

FIG. 4 shows one embodiment of a method 400 of monitoring a seasoning process for a container, according to one or more embodiments. As shown, the method 400 may generally include the steps of obtaining a container having a closed environment for housing an asset 402; calibrating a humidity sensor 404; measuring external humidity using the sensor 406; arranging the sensor in the closed environment 408; measuring the humidity in the closed environment using the sensor 410; determining a container measurement 412; determining an optimal humidity level for storing an asset 414; determining an optimal humidity controller for seasoning the container 416; obtaining the optimal humidity controller for seasoning the container 418; arranging the optimal humidity controller in the container for seasoning 420; measuring the humidity in the closed environment using the sensor 422; determining when the seasoning process will be complete 424; when seasoning is complete, removing the humidity controller from the container 426; and arranging the asset in the container 428. In other embodiments, the method 400 may include additional or alternative steps. Moreover, it is to be appreciated that some steps of the method 400 may be omitted in some embodiments.

Obtaining a container for housing an asset 402 may include obtaining a box, tube, tin, can, canister, or any other suitable container for housing an asset. For example, the container may be a cigar humidor, instrument case, or other suitably sized and shaped container for housing a particular asset. A humidity sensor, such as a humidity sensor described above, may be obtained and calibrated 404 prior to use. Calibration may be performed automatically or manually, and may include any suitable calibration methods. Calibrating the humidity sensor may include following manufacturer calibration instructions, for example.

Figure 11:
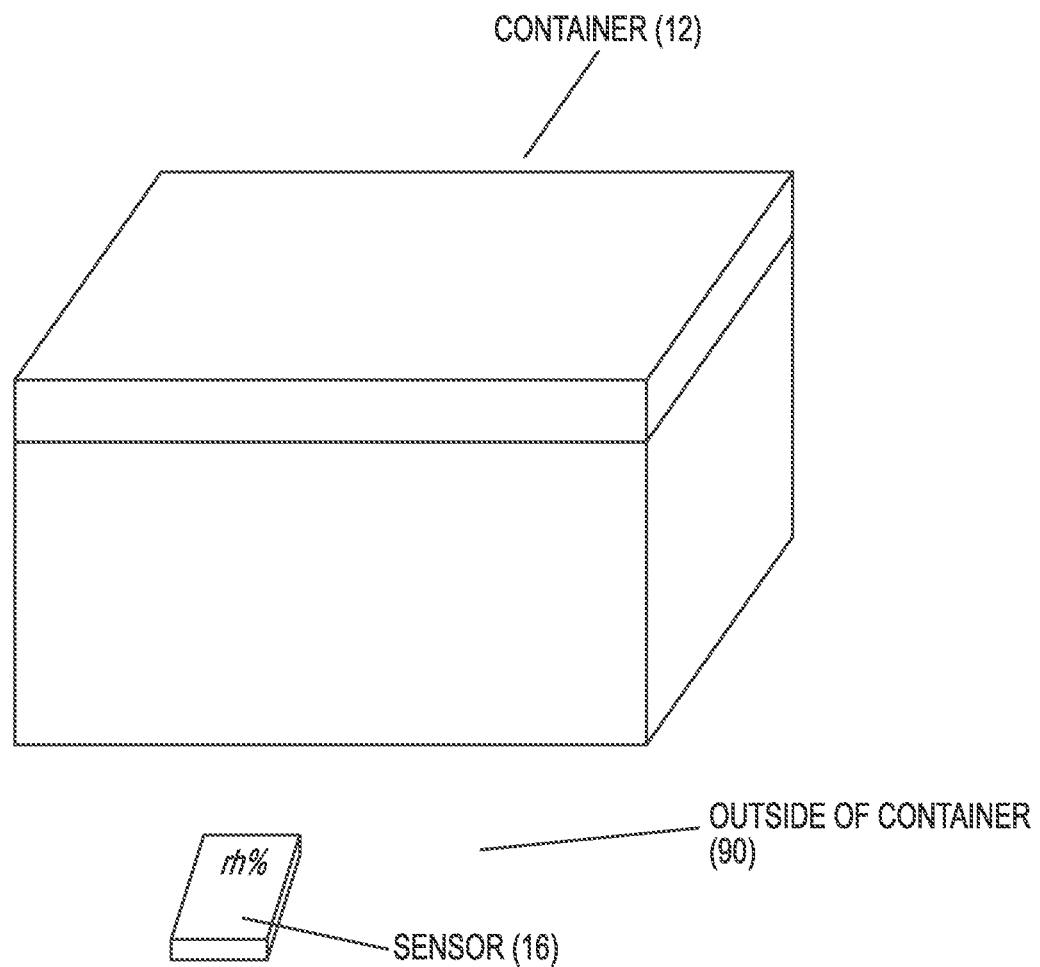
FIG. 11 is a schematic diagram of a sensor outside of a container, according to one or more embodiments of the present disclosure.
Figure 12:
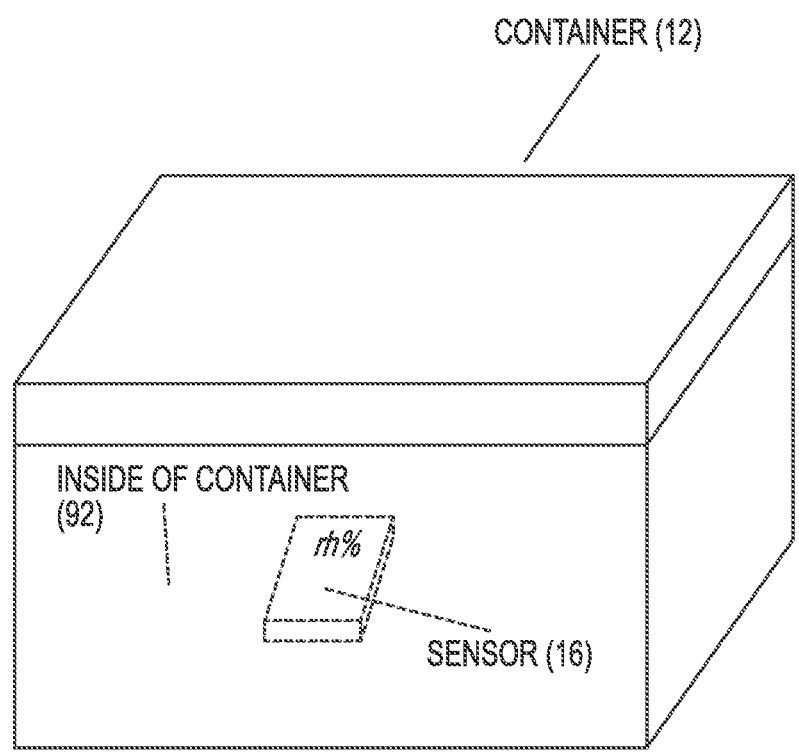
FIG. 12 is a schematic diagram of a sensor inside of a container, according to one or more embodiments of the present disclosure.

Measuring external humidity 406 may include using the sensor, which may have been calibrated at step 404, to measure a relative humidity outside of the container. As shown in FIG. 11, a humidity sensor 16 may be arranged outside 90 of a container 12 to measure an external RH. An external RH measurement may help to calculate or estimate a humidity leakage rate into or out of the container. The sensor may then be arranged within the closed environment 408, and may be used to measure a relative humidity inside the container 410. FIG. 12 illustrates the sensor 16 arranged in the container 12 for measuring relative humidity within the enclosure 92. The external and/or internal humidity measurements may be transmitted via a wired or wireless connection to a processor, server, or other component for analysis. In some embodiments, the external and/or internal humidity measurements may be entered via a user interface, for example. In other embodiments, the external and/or internal humidity measurements may be transmitted directly, and in some embodiments automatically, from the humidity sensor.

Figure 9:
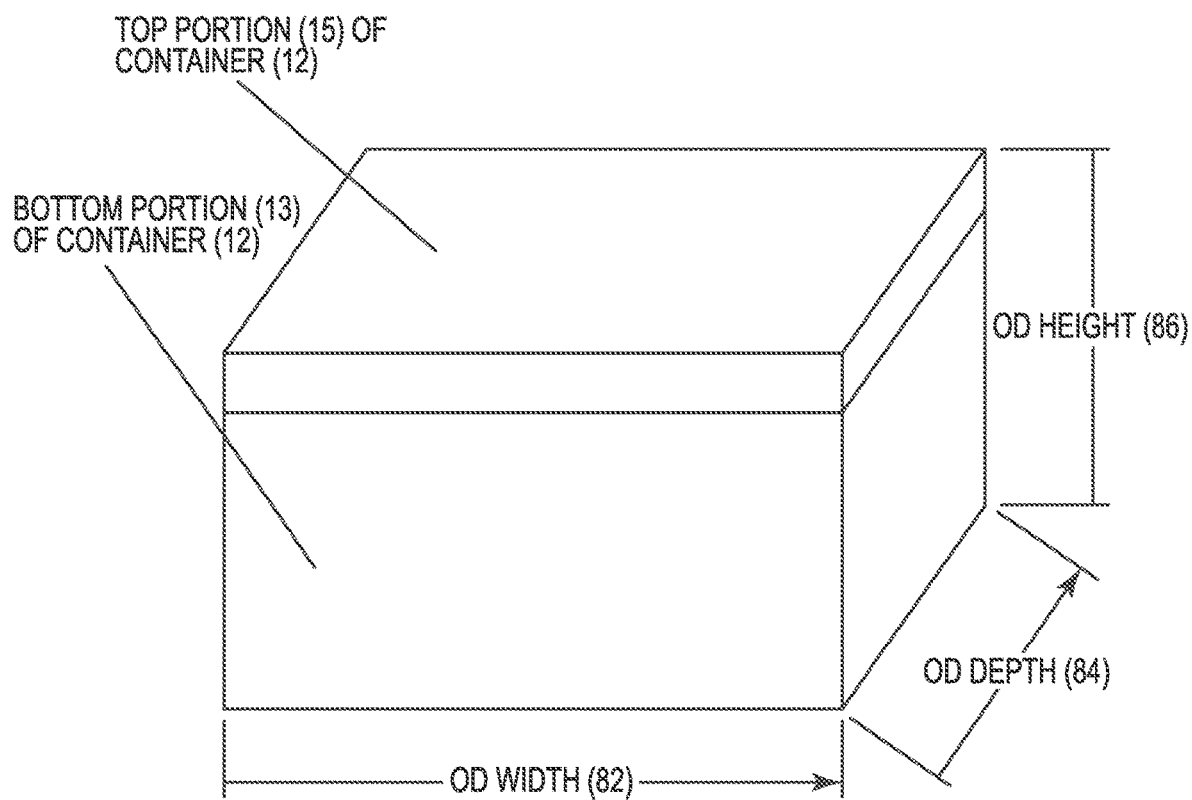
FIG. 9 is a schematic diagram of outer dimensions of container, according to one or more embodiments of the present disclosure.
Figure 10:
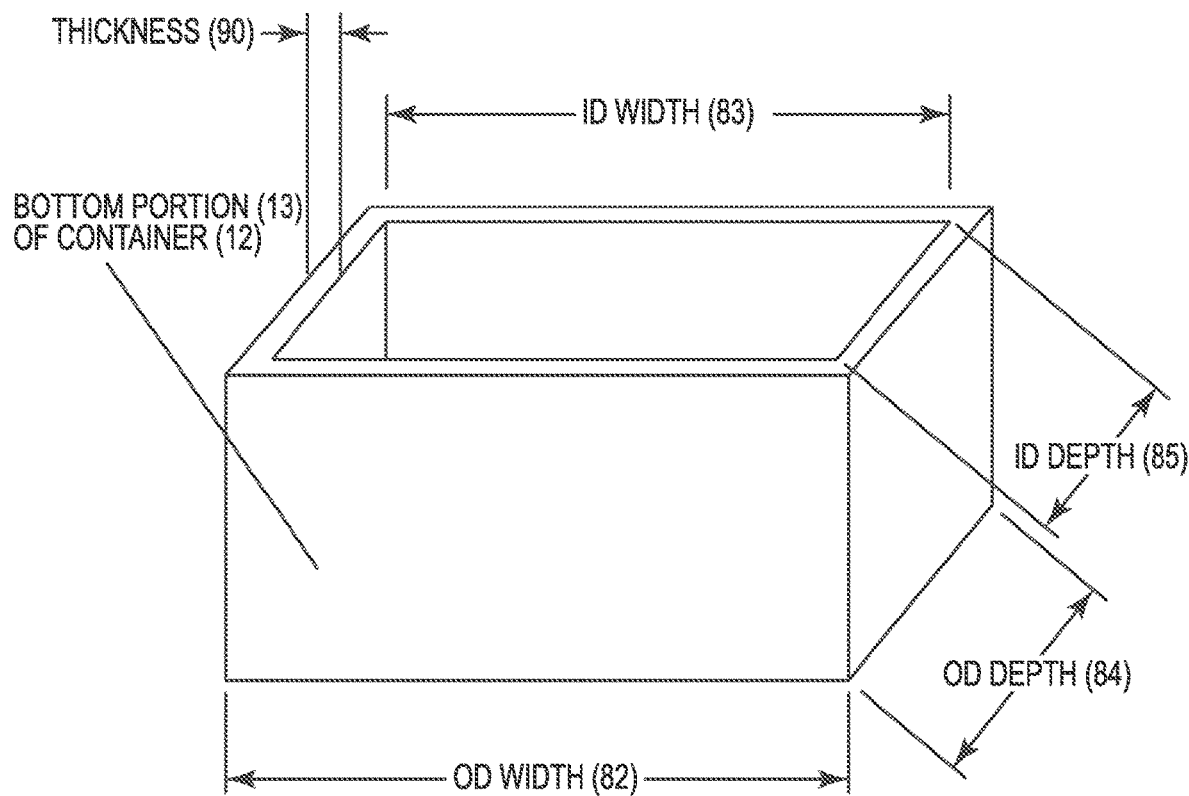
FIG. 10 is a schematic diagram of inner and outer dimensions of a container, according to one or more embodiments of the present invention.

With continued reference to FIG. 4, one or more dimensions of the container may be determined 412. The one or more dimensions may include one or more internal and/or external dimensions of the container. FIGS. 9 and 10 illustrate some internal and external dimensions that may be determined for a container 12, according to some embodiments. As shown for example in FIG. 9, an outer dimension (OD) width 82, OD depth 84, and OD height 86 of the container may be determined. The outer dimensions may generally be determined as including a top portion or lid 15, as shown in FIG. 9. Additionally or alternatively, as shown in FIG. 10, an inner dimension (ID) width 83, ID depth 85, and/or a wall thickness 90 of the container 12 may be determined. In some embodiments, the inner dimensions may be measured with respect to a bottom or lower portion 13 of the container 12, without the lid or top portion 15. In other embodiments, other suitable inner and/or outer dimensions of the container may be measured. For example, an inner and outer diameter may be measured with respect to a container having a cylindrical or circular shape. These dimensions may be used to calculate or estimate a thickness, such as an average thickness, of the container walls. Additionally or alternatively, container dimensions may be used to calculate or estimate a volume of the enclosure, container material volume, container material dry mass weight, and/or other parameters.

In general, the container dimensions may be determined using automated or manual methods. For example, a user may measure the dimensions using a tape measure, ruler, or other measuring device. In other embodiments, the dimensions may already be known. In still other embodiments, electronic and/or digital methods may be used to determine one or more inner or outer dimensions of the container. For example, images or photographs of the container may be compared to a reference object having known dimensions, as described below with respect to the method 800 of FIG. 8. Additionally, dimensions may be determined or calculated by application or program software encoded on a smartphone, tablet, or computer, for example.

With continued reference to FIG. 4, determining an optimal humidity level for an asset to be stored in the container 414 may include accessing one or more lookup tables. For example, a lookup table may list a plurality of assets or asset types with corresponding optimal humidity levels or humidity ranges for storage. As particular examples, the lookup table may list 69% relative humidity as an optimum humidity level for storing cigars, 62% relative humidity as an optimum humidity level for storing *cannabis*, and 49% relative humidity as an optimum humidity level for storing stringed musical instruments. In other embodiments, the lookup table(s) may list ranges of optimal humidity levels, or minimum or maximum humidity levels, for example.

Based on the determined optimal humidity level for the asset, one or more dimensions, internal humidity measurements, and/or external humidity measurements, an optimal humidity controller(s) for seasoning the container may be determined 416. As described above with respect to the recommendations module of FIG. 2, optimal controller(s) for seasoning the container may be selected based upon one or more dimensions of the container including but not limited to thickness of the container walls, a volume of the container, materials of the container, a moisture mass of the container, a dry mass of the container, a relative humidity inside the container, a relative humidity outside the container, a desired relative humidity within the container, and/or a desired timeframe for completing seasoning. In some embodiments, an optimal humidity controller for seasoning may be selected by determining an optimal moisture mass for the container walls suitable for maintaining a desired relative humidity within the container. The optimal moisture mass or moisture mass range may be determined using a moisture absorption isotherm for the wall material(s) of the container. A difference between current moisture mass of the container material and desired moisture mass may help determine an optimal humidity controller for seasoning the container, for example. In other embodiments, other variables and methods may be used to determine an optimal humidity controller for seasoning a container.

It is to be appreciated that in some embodiments, a lookup table may provide a starting point for developing a recommendation. For example, a lookup table may generally list suitable or optimal humidity controllers for known asset types. In some embodiments, additional information, such as sensed humidity data, container material properties or measurements, or other information may be considered in determining whether to recommend the humidity controller listed in the lookup table for the asset type, or whether to recommend a different controller.

In some embodiments, the optimal humidity controller for seasoning the container may include more than one humidity controller. For example, two, three, four, or more humidity controllers may be optimal for seasoning a container in some embodiments. In some embodiments, the suitable humidity controller type may be a size or RH rating of the humidity controller. For example, in one embodiment, two humidity controllers with an RH level of 69% may be identified as suitable or optimal for seasoning the container. As another example, one humidity controller with an RH level of 84% may be identified as suitable or optimal for seasoning the container. A recommended number of humidity controllers may be determined by comparing an amount of moisture needed to season the container with an available moisture content for a particular humidity controller type. For example, an amount of needed moisture may be divided by the available moisture for a particular type of humidity controller to determine a suitable number of that type of humidity controller to recommend. In this way, where multiple humidity controllers having a relatively low RH rating are suitable for a particular container, a single humidity controller having a higher RH rating may be suitable as well. In some embodiments, additional or alternative seasoning humidity controllers may be recommended in order to accelerate the seasoning process or to ensure seasoning is achieved. For example, while one controller may be suitable for seasoning a container, two humidity controllers may be recommended to season the controller in a shorter period of time. Multiple recommendations of different controllers or different combinations of controllers suitable for seasoning the container may be provided, such that a user may select the controller or combination of controllers to use. In this way, a recommendation for humidity controllers may include alternative options from which a user may choose a preference. In some embodiments, a recommendation for a type and number of humidity controllers may include a safety factor. For example, a number of recommended humidity controllers may be increased by a safety factor of 25% in some embodiments. In other embodiments, 25% moisture may be added to a minimum amount of moisture needed to reach a desired moisture mass. The safety factor may help ensure humidity controllers can contribute more than the minimum needed to reach a desired humidity or moisture level, and may accelerate seasoning in some embodiments.

The optimal humidity controller(s) for seasoning the container may be obtained using any suitable means. For example, a transaction to purchase the humidity controller(s) may be initiated and/or executed 418. In some embodiments, the optimal humidity controller(s) may be ordered by a user via a user interface, or may be ordered automatically or partially automatically. For example, the optimal humidity controller(s) may be automatically placed in an online "shopping cart" for purchase, and a user may be given an option to confirm or cancel the transaction. In other embodiments, the optimal humidity controller(s) may be purchased automatically based on stored payment information and/or stored user address information.

Figure 13:
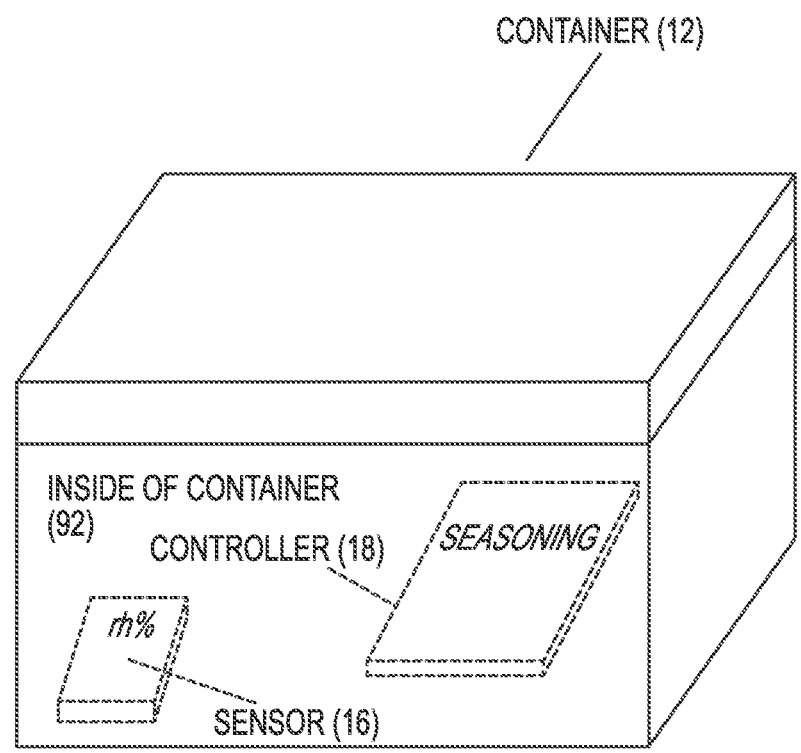
FIG. 13 is a schematic diagram of a sensor and seasoning humidity controller inside of a container for a seasoning process, according to one or more embodiments of the present disclosure.

Once obtained, the optimal humidity controller(s) may be arranged in the container for seasoning 420 to control humidity for seasoning the container. As shown for example in FIG. 13, a humidity controller 18 for seasoning may be placed in a container 12, together with a sensor 16. The humidity controller(s) may be arranged in a pocket, pouch, or other section or area of the container, which may be an area configured for receiving the humidity controller(s). In other embodiments, the humidity controller(s) may be removably or fixedly coupled to an inner wall or other surface of the container. In still other embodiments, the humidity controller(s) may simply be arranged within the container.

During the seasoning process, humidity within the container may be measured via the humidity sensor 422. For example, in some embodiments, a moisture mass of the container material may be measured. In other embodiments, an internal relative humidity of the closed environment may be measured. The humidity may be measured at intervals, intermittently, continuously, periodically, or on demand. In this way, the seasoning process may be monitored The method 400 may include determining or estimating when the seasoning process will be complete 424. This determination or estimation may be made based on the container dimension(s) and/or materials, number and type of humidity controller(s) used for seasoning, sensed humidity data, and/or other parameters. In some embodiments, one or more moisture diffusion models may be used to estimate a completion time for seasoning. For example, a moisture diffusion model relevant to the particular container material and/or wall thickness may be used. In some embodiments, a Fickian diffusion model may be used. In other embodiments, more complex models, such as those based on bound and free water, may be used additionally or alternatively. In still other embodiments, for example where a container's walls have a relatively constant thickness and are constructed of a single material, a linear diffusion model may be used. Finite element modeling may be used for more complex cases. The Finite Difference method, or similar methods, may be used to solve time varying diffusion problems. Representative diffusion constants for different wall materials may be known. In some embodiments, a moisture isotherm may be used to convert from relative humidity to mass density of water in the container wall material. Constraints for the model may include internal air cavity humidity level, external wall humidity level, and rate of moisture evaporation or absorption by the humidity controllers. The external wall humidity level can be set to that of the external environment, if there are no barriers such as lacquers, coatings, or laminates on the external face. However, if the external wall layer is impermeable, such as with thick coatings and laminates, the external humidity level may rise and fall with the internal state of the container wall moisture content profile. The initial moisture content profile through a wall can be estimated to be even at the beginning of the model, unless more information is known. The initial moisture content profile may be set to be the equivalent of the relative humidity of the internal air cavity at equilibrium when closed and before any humidity controllers have been added. In some embodiments, the mass balance between water absorbed into the container walls must equal or be below the mass of water evaporated by the controllers. That is to say, in some embodiments, the diffusion model may be constrained on the inner surface to no more than can be evaporated by the humidity controllers. Similar constraints may exist for moisture absorption rates by the humidity controllers. Additionally, the mass balance may also account for the rate of moisture leakage through the seams, seals and walls of the container, and/or for uptake or evolution by items in the container during the seasoning process.

In other embodiments, the time for completing a seasoning process may be determined or established as a desired length of time (for example, 14 days), and the type and/or number of humidity controllers to season the container during that time may be calculated based, in part, on the desired length of time for seasoning. In some embodiments, the humidity sensor may be used to determine, or verify, when the seasoning process is complete. The seasoning process may be complete when a humidity level within the container material, or a relative humidity within the enclosure, has reached a desired or optimal humidity level, or has maintained a desired or optimal humidity level for a period of time.

When seasoning is complete, the humidity controller(s) used to season the container may be removed from container 426. With the container suitably seasoned, the asset may be placed in the container for storage 428. In some embodiments, some or all of the steps of the method 400 may be repeated, such as where a container is to be re-seasoned.

The process of seasoning the container may introduce a desired humidity to the material of the container, such that the container may be prevented or mitigated from undesirably affecting the humidity in the closed environment. In particular, the seasoning process may introduce moisture into the container material, so as to prevent or mitigate the container from drawing moisture away from the closed environment. In other embodiments, the seasoning process may reduce moisture in the container material, so as to prevent or mitigate the container from adding too much moisture to the environment. Once the container is seasoned for storing or housing an asset, the asset may be arranged in the container for storage, as indicated above. In some embodiments, it may be desirable to control humidity within the closed environment while the asset is stored or housed therein.

Figure 5:
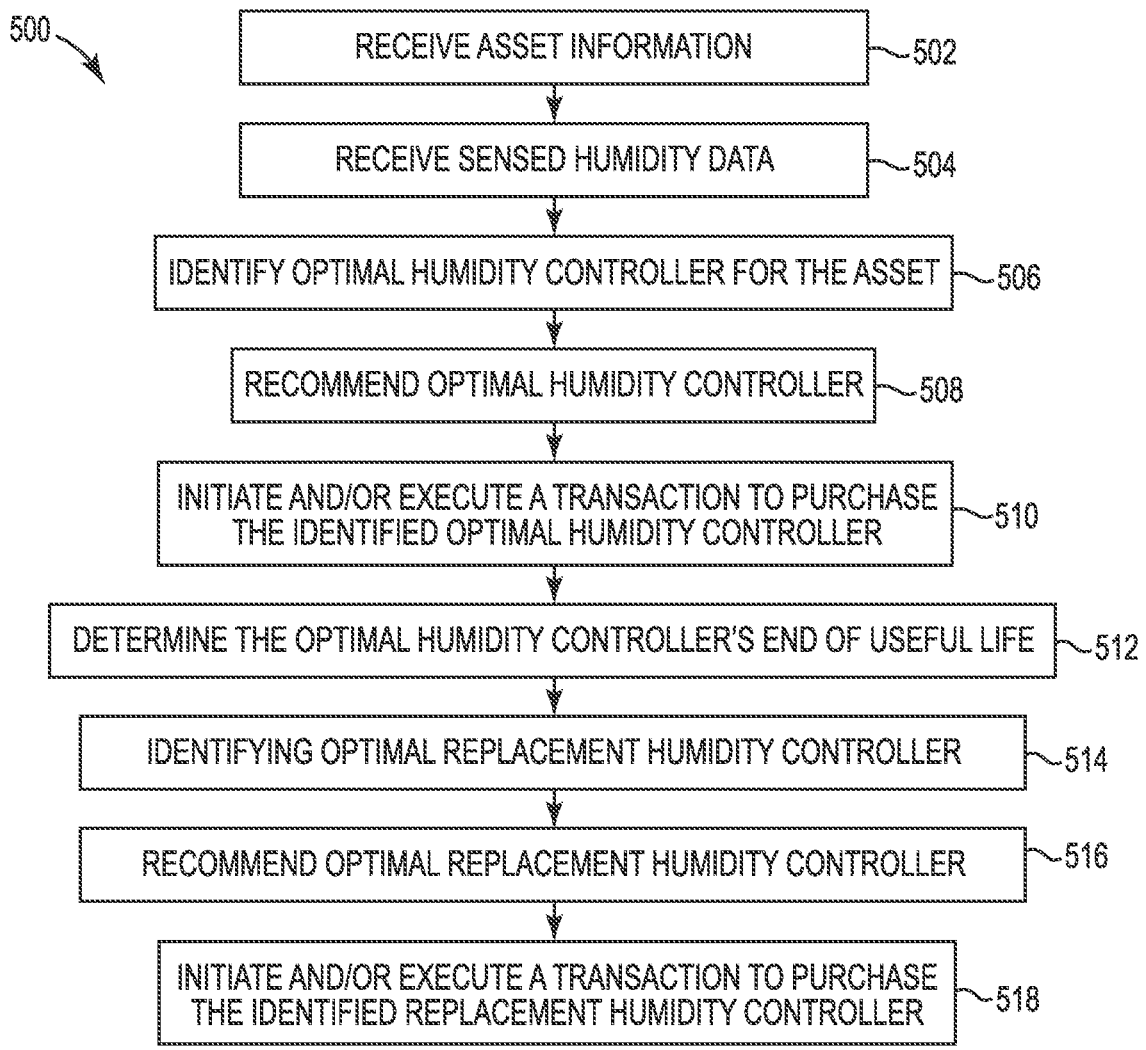
FIG. 5 is a flow diagram of a method of maintaining relative humidity within a container, according to one or more embodiments of the present disclosure.

Turning now to FIG. 5, one embodiment of a method 500 of maintaining relative humidity within a container of the present disclosure is illustrated. The method 500 may include the steps of receiving asset information 502; receiving sensed humidity data 504; identifying an optimal humidity controller for the asset 506; recommending the optimal humidity controller 508; initiating and/or executing a transaction to purchase the identified optimal humidity controller 510; determining the optimal humidity controller's end of useful life 512; identifying a replacement humidity controller 514; recommending the replacement humidity controller 516; and initiating and/or executing a transaction to purchase the replacement humidity controller 518. In other embodiments, the method 500 may include additional or alternative steps. Moreover, it is to be appreciated that some steps of the method 500 may be omitted in some embodiments.

The method 500 may include receiving asset information 502 regarding an asset stored, or to be stored, in a closed environment. Asset information may include information related to the asset for which the humidity controller is or will be used. Such information may include the type of asset, the brand or make of the asset, dimensions, size, or number of the asset, and/or other asset related information. The information may be received from a user. For example, a user may enter the asset information via a user interface in some embodiments. In other embodiments, the asset information may be stored information, which may be retrieved from a database. While not shown in FIG. 5, in some embodiments, the method 500 may additionally include receiving container information related to the container defining the closed environment in which the asset is stored. Container information may include size, dimensions(s), material(s), type, shape, and/or other information about the container.

The method 500 may additionally include receiving humidity data from a humidity sensor arranged in the closed environment 504. The humidity sensor may be configured to sense a relative humidity within the closed environment. In some embodiments, the humidity sensor may be a same humidity sensor used for a seasoning process. In other embodiments, the humidity sensor may be a different sensor. Relative humidity, for example, may be sensed continuously, intermittently, at intervals, periodically, or on demand within the closed environment. The humidity data may be received over a wired or wireless network. In some embodiments, humidity data may be tracked or monitored begin from when the humidity controller is first placed in service or otherwise first placed in the closed environment. In other embodiments, the humidity may be tracked or sensed over a predetermined period.

Using the received asset information and/or humidity data, an optimal humidity controller for the asset may be identified 506. For example, one or more lookup tables may be used to determine an optimal humidity controller for the asset. In some embodiments, for example, the asset or asset type may be identified in a lookup table having optimal humidity controller recommendations for different asset types. Similarly, in some embodiments, the lookup table may include recommended or suitable humidity controllers for different humidity conditions. Data in lookup tables may be based upon industry standards in some embodiments. In some embodiments, the identification of an optimal humidity controller may be made with reference to a database and/or lookup table of humidity controller products available for purchase or use. The database may include information such as, but not limited to, the performance, engineering, and/or technical specifications for the humidity controller products. In some embodiments, optimal humidity controllers may be identified based on a relative humidity rating of the humidity controller. For example, a humidity controller may have a relative humidity rating of 49%, 58%, 62%, 65%, 69%, 72%, 75%, 84%, and/or any other suitable relative humidity. In other embodiments, the optimal humidity controller may be selected based on a size of the humidity controller, such as a number of grams of humidity control material within the humidity controller.

Moreover, in some embodiments, received humidity data and/or other variables may be considered in making a recommendation for an optimal humidity controller. For example, if historical sensed humidity data shows a rate of moisture leakage, a different humidity controller than that listed in a lookup table may be identified as optimal for the particular situation. Similarly, if humidity data or other information suggests that a current or previous humidity controller reached its end of useful life quicker than expected, a different humidity controller than that listed in a lookup table may be identified as optimal for the particular situation.

In some embodiments, the identified optimal humidity controller may be recommended to a user for purchase 508. Recommending the identified optimal humidity controller for purchase may include sending an alert or recommendation to a user, such as via a user interface or computing device. Additionally, a transaction to purchase the identified optimal humidity controller may be initiated and/or executed 510. In some embodiments, the optimal humidity controller may be ordered by a user via a user interface, or may be ordered automatically or partially automatically. For example, the optimal humidity controller may be automatically placed in an online "shopping cart" for purchase, and a user may be given an option to confirm or cancel the transaction. In other embodiments, the optimal humidity controller(s) may be purchased automatically based on stored payment information and/or stored user address information. The purchase may cause the selected optimal humidity controller to be sent or shipped to the user's stored address. In a non-limiting exemplary embodiment, the purchase transaction may include a "one-click" payment option as is well known in the art. In certain embodiments, the payment transaction may further include providing the user an ability to change the payment method and/or update any previously stored payment related information. In a non-limiting exemplary embodiment, the user is always provided an ability to cancel the transaction at any point in the process.

Determining the optimal humidity controller's end of useful life 512 may include accessing stored information about the optimal humidity controller in a database and/or one or more lookup tables. The stored information may include predicted useful lifespans for the controller. A humidity controller's end of useful life may occur when the humidity controller's remaining moisture falls low enough that the humidifying capability of the controller suffers, and humidity levels within the container may begin to fall below a desired level or range. Alternatively, an end of useful life for a humidity controller may occur when the humidity controller has absorbed its capacity of moisture from the closed environment and can no longer absorb humidity, in which case a humidity level within the container may rise above a desired level or range. In some embodiments, the end of useful life may be predicated based on a stored history of previous humidity controllers. The end of life of a humidity controller may occur when the evaporation rate of the humidity controller no longer can match the rate of moisture loss or leakage through seams, seals, and/or walls of the container. In this way, an end of useful life may be predicted, at least in part, by container leakage measurements, calculations, determinations, or estimations. End of useful life may occur, in some embodiments, when a humidity controller has dried out or inflated. In some embodiments, the prediction of the end of useful life of the controller may be made based on a size and/or type of asset, and a size and/or type of enclosure.

In some embodiments, the method 500 may include identifying a replacement humidity controller 514. In some embodiments, the current or previously ordered humidity controller may be automatically identified as the optimal replacement humidity controller. However, in other embodiments, a replacement controller may be determined by reevaluating the asset information, sensed humidity data, lookup table(s), and/or other information to determine an optimal humidity controller. The same humidity controller may be determined as optimal, or a different humidity controller may be determined as optimal, such as where one or more parameters has changed since a last determination of an optimal controller.

Once a replacement controller is identified, the replacement controller may be recommended to a user 516. For example, a recommendation or alert may be provided to the user via a user interface or computing device. In some embodiments, the user may be provided comparative information comparing the identified replacement humidity controller and a humidity controller currently in service. Such comparative information may be useful to the user in understanding why the recommended humidity controller is different from that in service. In some embodiments, if the in-service and replacement humidity controller are the same, it may not be necessary to provide the comparative information. In other embodiments, the recommendation may include information such as the performance of the humidity controller in service.

A transaction to purchase the optimal replacement humidity controller may be initiated and/or executed 518. In some embodiments, the transaction to purchase the replacement controller may be initiated or executed automatically before the determined end of useful life of the current controller. In some embodiments, the initiation and/or execution of the transaction to purchase the replacement controller may be manual or partly automated. In a non-limiting exemplary embodiment, the user is provided an option to select, for purchase, between the recommended and the in-service humidity controller. In some embodiments, the user may be provided an option to change the quantity and/or the type (e.g., product number) of the recommended or the in-service humidity controller being purchased. In some embodiments, the user may be provided an option to select and/or order the desired quantity and/or the type of the humidity controller which may be different from the humidity controller currently in-service and/or the recommended humidity controller. In other embodiments, the initiation and/or execution of the transaction to purchase the recommended humidity controller may be automatically performed. Stored payment information and/or stored user address information may be used to complete the purchase.

Figure 6:
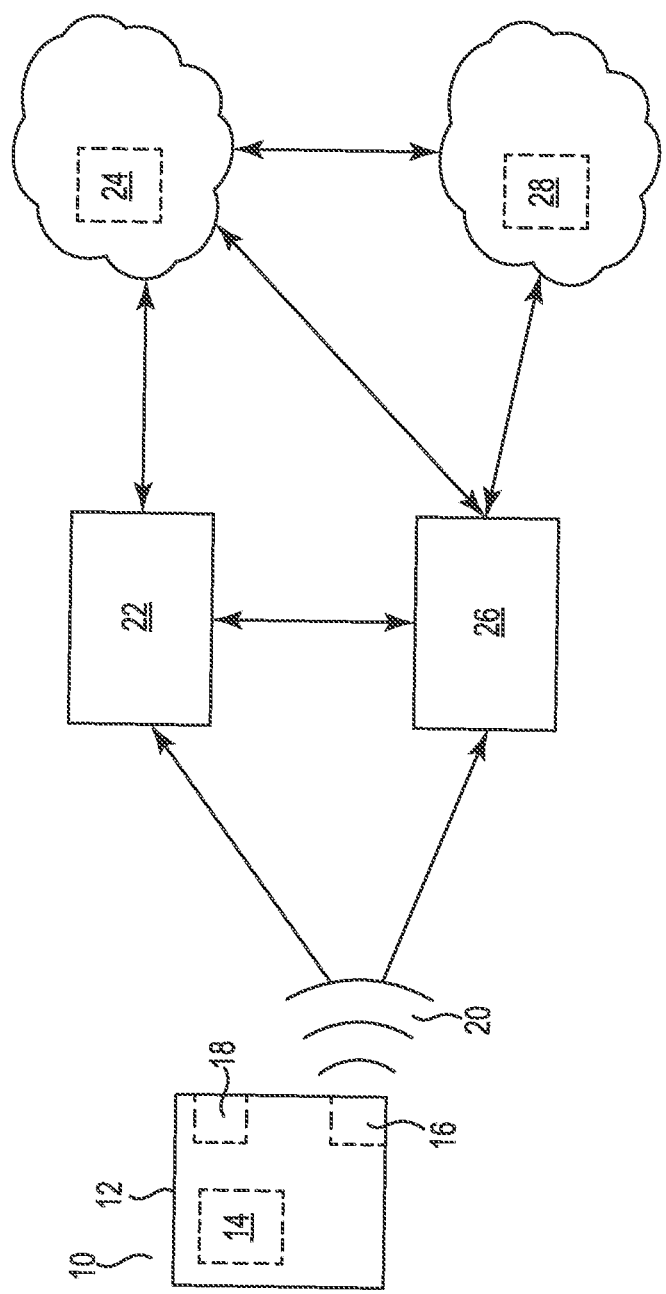
FIG. 6 is a schematic diagram of a system of the present disclosure, according to one or more embodiments.

Turning now to FIG. 6, another system 600 of the present disclosure is shown, according to one or more embodiments. The system 600 may be configured for monitoring or sensing a humidity condition in a closed environment 10 defined by a container 12, and/or determining an optimal humidity controller for the environment and/or an asset 14 arranged in the environment. As shown in FIG. 6, a humidity sensor 16 and a humidity controller 18 may be arranged within the environment 10, as described above. In some embodiments, the system may additionally include one or more servers 24, a computing device 26, and/or a commerce platform 28. Each of the server(s) 24, computing device 26, and/or commerce platform 28 may be in wired or wireless operative communication 20 with the humidity sensor 16 and/or with one another. For example, the sensor 16 may communicate with the server(s) 24 and computing device 26 via a Wi-Fi bridge 22. In other embodiments, the sensor 16, server(s) 24, computing device 26, and/or commerce platform 28 may communicate using Bluetooth, RFID, QR code(s), hyperlinks to web pages, and/or other coding methods as well as other wired or wireless technologies.

As described above, the humidity sensor 16 may be a wired or wireless sensor configured to sense humidity data. For example, the sensor 16 may be configured to sense a humidity level within the material of the container 12 in some embodiments. Additionally or alternatively, the sensor 16 may be configured to sense a relative humidity data within the closed environment 10. The sensor 16 may be configured to sense humidity data continuously, periodically, intermittently, randomly, and/or on demand. Additionally, the sensor 16 may be configured to send sensed humidity data to the one or more servers 24 and/or to the computing device 26. The data may be sent as it is collected, or may be sent according to any suitable schedule.

The computing device 26 may be or include a smartphone, tablet computer, laptop computer, desktop computer, smartwatch, and or other computing device. The computing device 26 may generally provide a portal through which a user may access the server(s) 24 and/or commerce platform 28. The computing device 26 may provide an application or program interface. The application or program interface may provide information received from the humidity sensor 16. Additionally, the application or program interface may allow a user to access data stored on the one or more server(s) 24 related to the enclosure 12, asset 14, humidity controller 18, and/or other information. Additionally, the application or program interface may allow a user to review recommendations for humidity controllers and/or to order humidity controllers. Moreover, the computing device 26 may provide alerts and/or recommendations to a user.

The commerce platform 28 may provide a platform or interface through which humidity controllers may be purchased, ordered, and/or shipped. In some embodiments, the commerce platform 28 may include a website or web address with an online ordering or purchasing application or interface.

Figure 7:
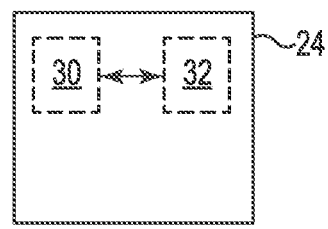
FIG. 7 is a schematic diagram of a server of the present disclosure, according to one or more embodiments.

The one or more servers 24 may each be local or remote servers. For example, one or more servers 24 may be a cloud-based server. Each server 24 may include hardware and/or software. The server(s) 24 may generally be configured to receive humidity data sensed by, and sent from, the sensor 16. FIG. 7 shows one embodiment of a server 24. As shown, the server 24 may have processor 30 controlling at least some operations of the server 24, and a memory 32 in operative communication with the processor. The memory may be configured to store data sensed by the sensor 16. Additionally, the memory 32 may store data related to the container 12, such as dimensions, size, type, materials, and/or other container information. The memory 32 may also store information related to the asset 14, such as asset type, size, number, and/or other asset information. The memory 32 may additionally store information related to a desired or optimal humidity level for the asset 14. In some embodiments, the memory 32 may store one or more lookup tables for determining a desired or optimal humidity level for the asset 14. In some embodiments, one or more lookup tables may list humidity controllers arranged by humidity control capacity and/or useful life under known humidity conditions, and a plurality of asset types associated with at least one of the listed humidity controllers, wherein the associated listed humidity controllers may be optimized for controlling humidity of the associated asset type(s). Moreover, in some embodiments, the memory 32 may store address and/or payment information for a user or customer, who may be an owner of the asset 14. In some embodiments, the memory 32 may store computer executable instructions executable by the processor 30 and/or server(s) 24 for identify, recommending, and/or purchasing an optimal humidity controller.

Figure 8:
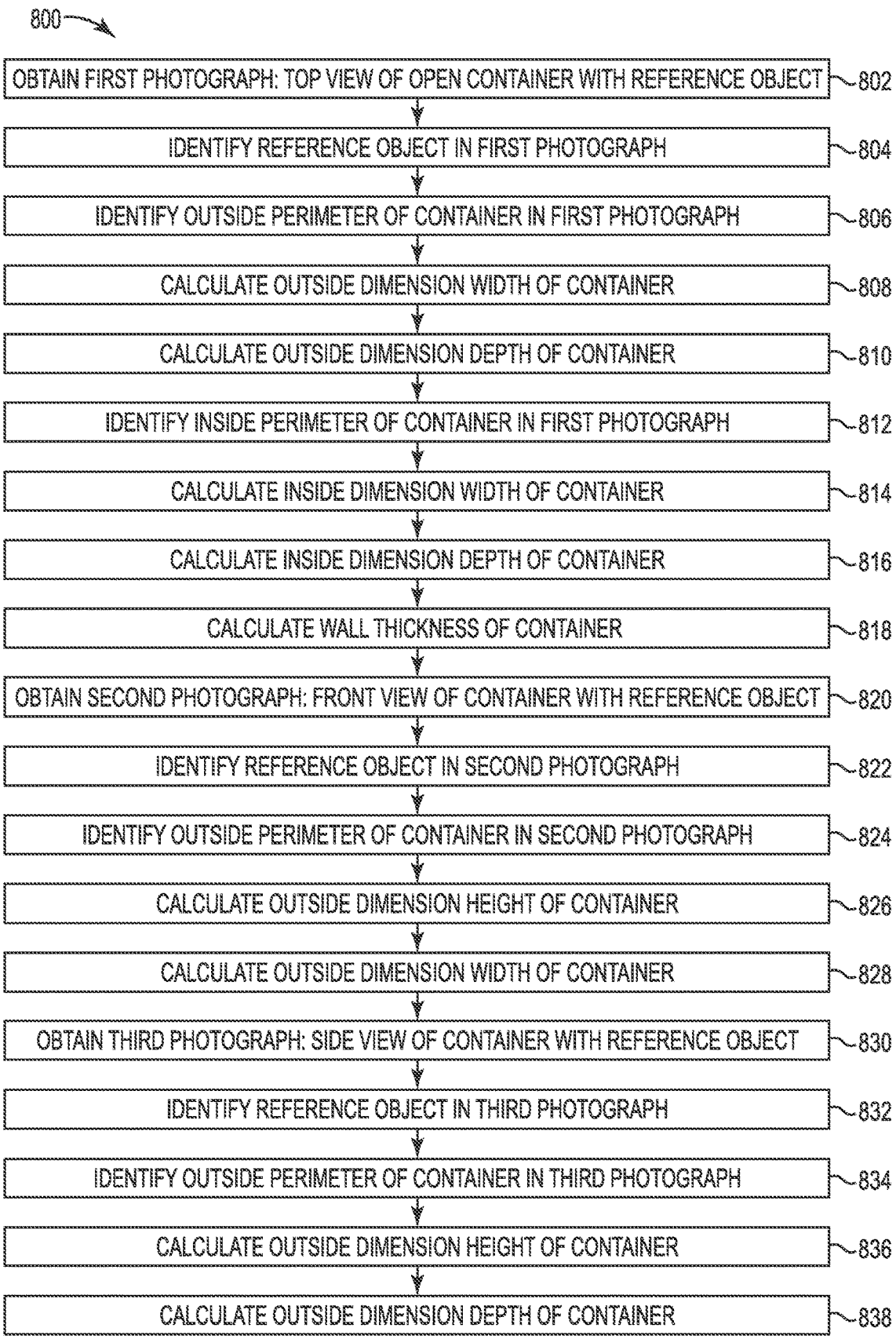
FIG. 8 is a flow diagram of a method of determining one or more dimensions of a container, according to one or more embodiments of the present disclosure.
Figure 14:
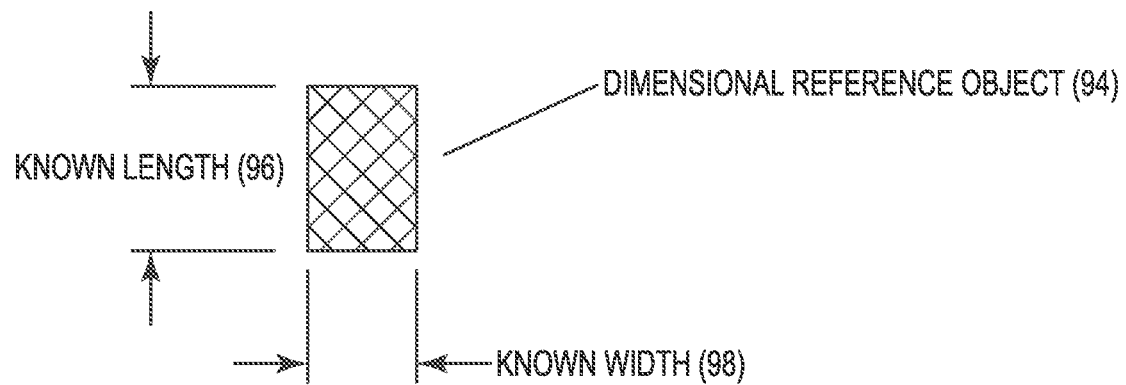
FIG. 14 is a schematic diagram of a reference object for photographically determining a reference object of a container, according to one or more embodiments of the present disclosure.

As described above, in some embodiments, one or more dimensions of a container may be determined electronically. For example, one or more photographs or images may be used to determine or measure one or more dimensions of a container. In some embodiments, one or more photographs or images may be taken of the container together with, or adjacent, a reference object having a known dimension. FIG. 14 shows one embodiment of a reference object 94. The reference object 94 may have any suitable shape and size with known dimensions. In some embodiments, the reference object may have a rectangular cross sectional shape with a known length 96 and width 98. In other embodiments, the reference object may have a square, circular, or other suitable shape with known dimensions. FIG. 8 illustrates a method for determining container dimensions by means of digital photos, according to at least one embodiment. In general, the method 800 may include taking photos of the container, together with a reference object having known dimensions, identifying the reference object in the photos, and calculating dimensions of the container based on known dimensions of the reference object.

Figure 15:
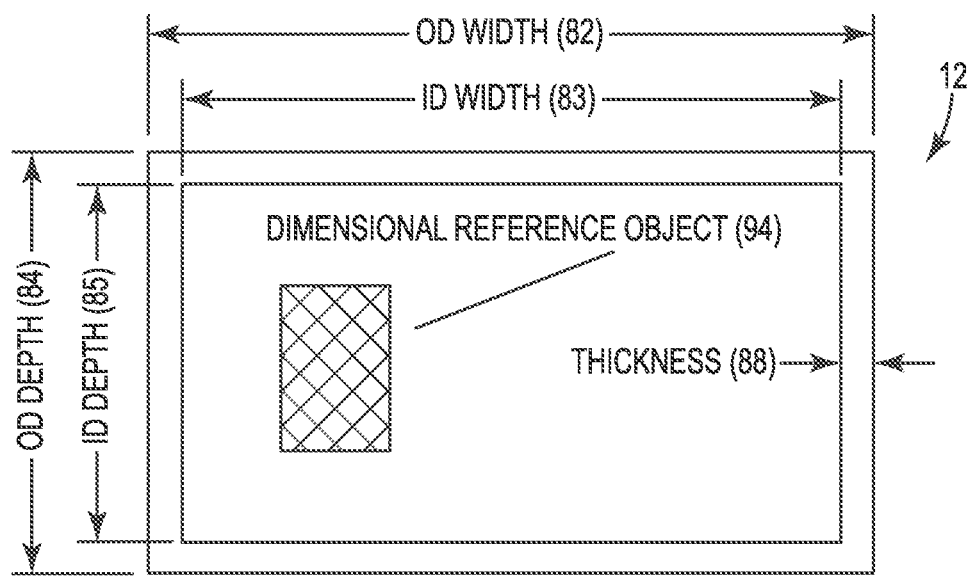
FIG. 15 is a schematic diagram of a top view of a container with a reference object for use in determining a dimension of the container, according to one or more embodiments of the present disclosure.

For example, the method 800 may include the steps of obtaining a first photograph, which may be a top view of the open container, together with a reference object 802. FIG. 15 shows one embodiment of a top view of a container 12 with a reference object 94. The reference object may be arranged within the container 12 in some embodiments. In other embodiments, the reference object may be arranged next to the container 12 for the photograph. In the first photograph, the reference object 94 may be identified 804. Moreover, an outer perimeter of the container 12 may be identified in the first photograph 806. Identification of the reference object and outer perimeter may be performed manually, such as by a user making selections at a user interface. In other embodiments, the reference object and outer perimeter may be identified automatically. Based on the known dimensions of the reference object 94 and the locations of the reference object and outer perimeter of the container 12 in the first photograph, an OD width 82 of container may be calculated 808. The OD width 82 may be calculated manually or automatically. Additionally, based on the known dimensions of the reference object 94 and the locations of the reference object and outer perimeter of the container 12 in the first photograph, an OD depth 84 of the container may be calculated 810. The OD depth 84 may be calculated manually or automatically. An inner perimeter of the container 12 may also be identified in the first photograph 812, manually or automatically. The inner perimeter may define the enclosed area of the container 12. Based on the known dimensions of the reference object 94 and the locations of the reference object and inner perimeter of the container 12 in the first photograph, an ID width 83 of container may be calculated 814. The ID width 83 may be calculated manually or automatically. Additionally, based on the known dimensions of the reference object 94 and the locations of the reference object and inner perimeter of the container 12 in the first photograph, an ID depth 85 of container may be calculated 816. The ID depth 85 may be calculated manually or automatically. Additionally, based on the known dimensions of the reference object 94 and the locations of the reference object and inner and outer perimeter of the container 12 in the first photograph, a thickness 88 of container may be calculated 818. The thickness 88 may be calculated manually or automatically.

Figure 16:
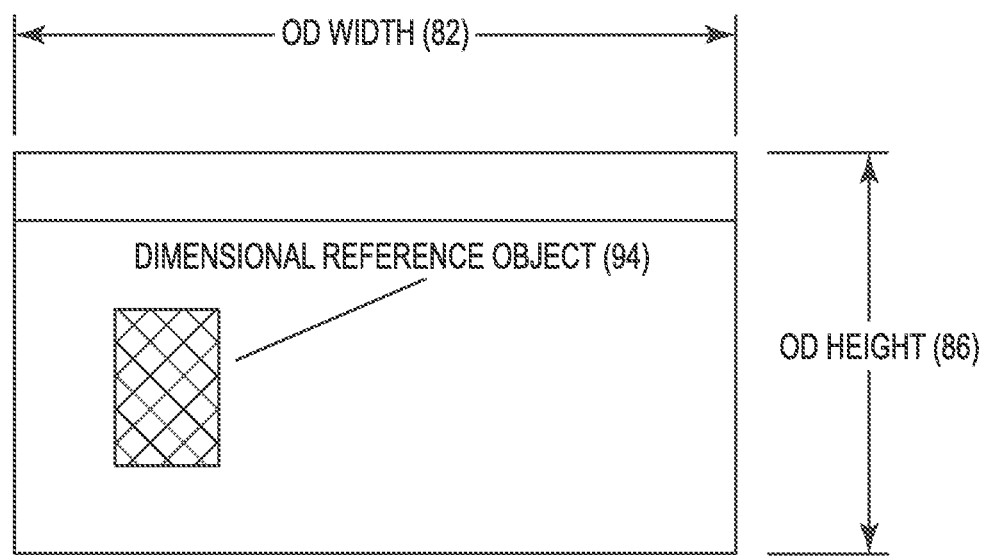
FIG. 16 is a schematic diagram of a front view of a container with a reference object for use in determining a dimension of the container, according to one or more embodiments of the present disclosure.

The method 800 may additionally include obtaining a second photograph, which may be a front view of the container with the reference object 820. FIG. 16 shows one embodiment of a front view of a container 12 with a reference object 94. The reference object 94 may be arranged adjacent to the container 12 for the photograph. In some embodiments, the reference object 94 may be removably or fixedly coupled to a front surface of the container 12. In the second photograph, the reference object 94 may be identified 822. Moreover, an outer perimeter of the container 12 may be identified in the second photograph 824. Identification of the reference object and outer perimeter may be performed manually, such as by a user making selections at a user interface. In other embodiments, the reference object and outer perimeter may be identified automatically. Based on the known dimensions of the reference object 94 and the locations of the reference object and outer perimeter of the container 12 in the second photograph, an OD height 86 of container may be calculated 826. The OD height 86 may be calculated manually or automatically. Additionally, based on the known dimensions of the reference object 94 and the locations of the reference object and outer perimeter of the container 12 in the second photograph, an OD width 82 of the container may be calculated 828. The OD width 82 may be calculated manually or automatically. However, it may be appreciated that where the OD width 82 was already calculated with respect to the first photograph, it may not be necessary to calculate an OD width from the second photograph.

Figure 17:
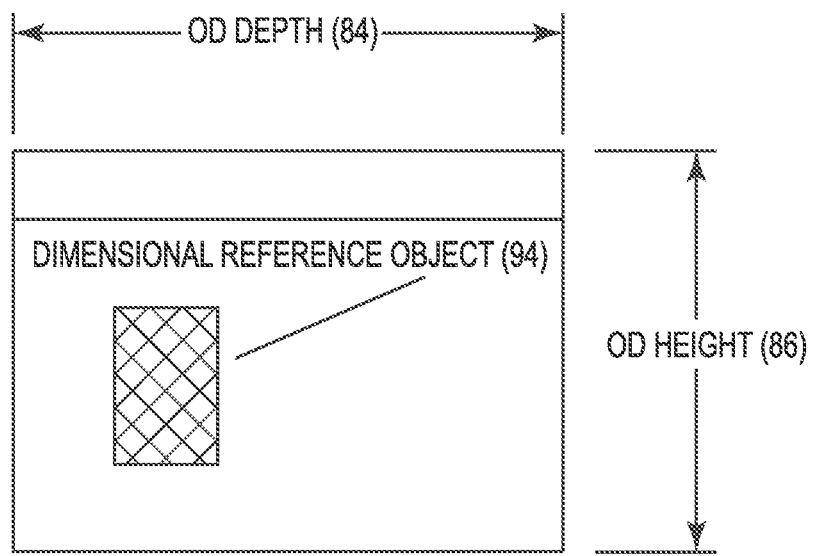
FIG. 17 is a schematic diagram of a side view of a container with a reference object for use in determining a dimension of the container, according to one or more embodiments of the present disclosure.

The method 800 may additionally include obtaining a third photograph, which may be a side view of the container with the reference object 830. FIG. 17 shows one embodiment of a side view of a container 12 with a reference object 94. The reference object 94 may be arranged adjacent to the container 12 for the photograph. In some embodiments, the reference object 94 may be removably or fixedly coupled to a side surface of the container 12. In the third photograph, the reference object 94 may be identified 832. Moreover, an outer perimeter of the container 12 may be identified in the third photograph 834. Identification of the reference object and outer perimeter may be performed manually, such as by a user making selections at a user interface. In other embodiments, the reference object and outer perimeter may be identified automatically. Based on the known dimensions of the reference object 94 and the locations of the reference object and outer perimeter of the container 12 in the third photograph, an OD height 86 of container may be calculated 836. The OD height 86 may be calculated manually or automatically. However, it may be appreciated that where the OD height 86 was calculated with respect to the second photograph, it may not be necessary to calculate an OD height from the third photograph. Additionally, based on the known dimensions of the reference object 94 and the locations of the reference object and outer perimeter of the container 12 in the third photograph, an OD depth 84 of the container may be calculated 838. The OD depth 84 may be calculated manually or automatically. However, it may be appreciated that where the OD depth 84 was already calculated with respect to the first photograph, it may not be necessary to calculate an OD depth from the third photograph.

Figure 18:
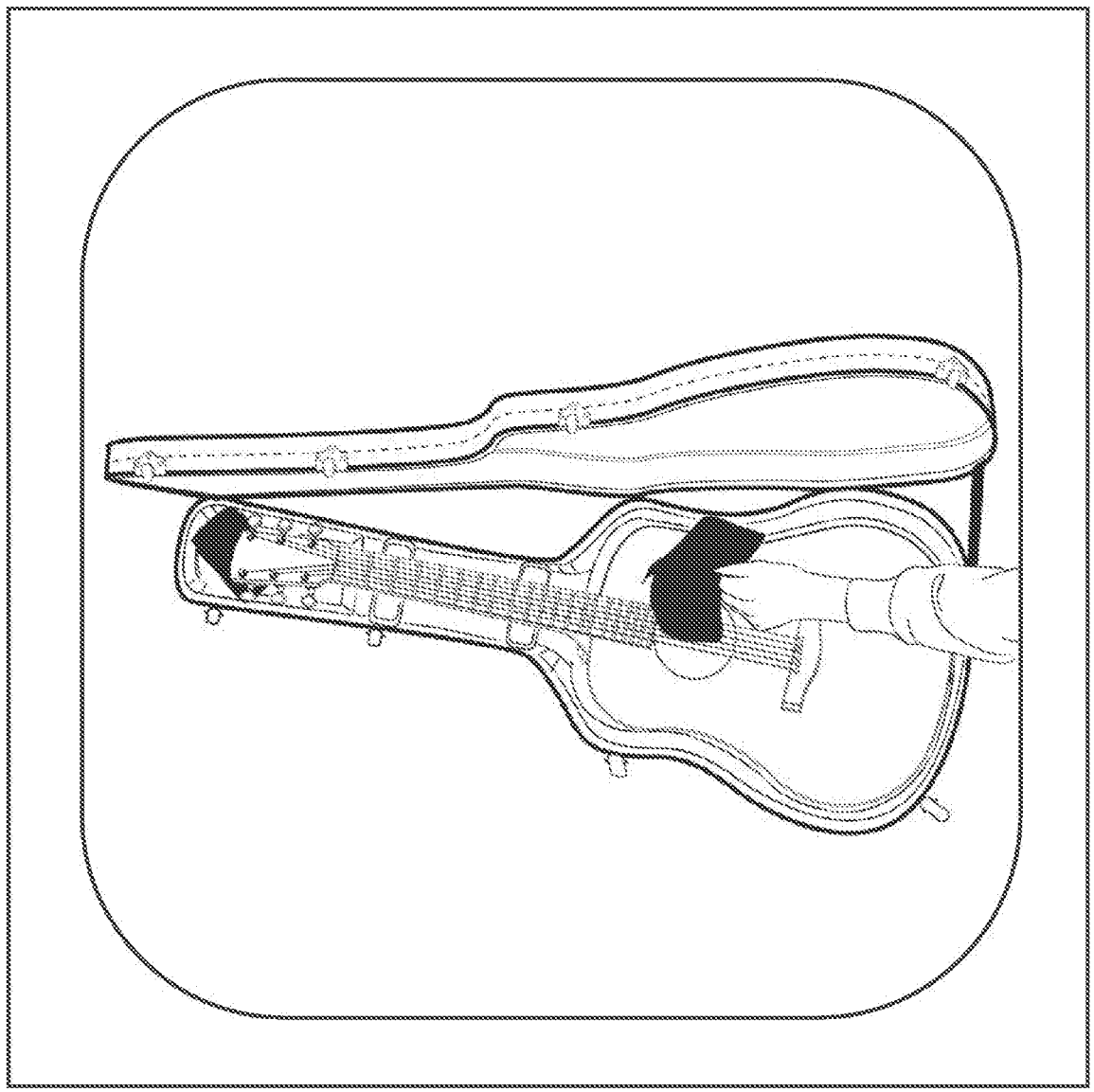
FIG. 18 is a top view of an enclosure for an instrument, according to one embodiment.

One or more of the above-described first, second, and third photographs may be used to calculate one or more inner or outer dimensions of the container. In other embodiments, additional or alternative photographic views may be used to determine one or more inner or outer dimensions of the container. Moreover, it is to be appreciated that any of the above described methods, including but not limited to the method 800, may be used to determine inner and/or outer measurement(s) of containers having differing shapes, including irregular shapes such as an instrument case, as shown for example in FIG. 18.

For purposes of this disclosure, any system described herein may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, a system or any portion thereof may be a minicomputer, mainframe computer, personal computer (e.g., desktop or laptop), tablet computer, embedded computer, mobile device (e.g., personal digital assistant (PDA) or smart phone) or other hand-held computing device, server (e.g., blade server or rack server), a network storage device, or any other suitable device or combination of devices and may vary in size, shape, performance, functionality, and price. A system may include volatile memory (e.g., random access memory (RAM)), one or more processing resources such as a central processing unit (CPU) or hardware or software control logic, ROM, and/or other types of nonvolatile memory (e.g., EPROM, EEPROM, etc.). A basic input/output system (BIOS) can be stored in the non-volatile memory (e.g., ROM), and may include basic routines facilitating communication of data and signals between components within the system. The volatile memory may additionally include a high-speed RAM, such as static RAM for caching data.

Additional components of a system may include one or more disk drives or one or more mass storage devices, one or more network ports for communicating with external devices as well as various input and output (I/O) devices, such as digital and analog general purpose I/O, a keyboard, a mouse, touchscreen and/or a video display. Mass storage devices may include, but are not limited to, a hard disk drive, floppy disk drive, CD-ROM drive, smart drive, flash drive, or other types of non-volatile data storage, a plurality of storage devices, a storage subsystem, or any combination of storage devices. A storage interface may be provided for interfacing with mass storage devices, for example, a storage subsystem. The storage interface may include any suitable interface technology, such as EIDE, ATA, SATA, and IEEE 1394. A system may include what is referred to as a user interface for interacting with the system, which may generally include a display, mouse or other cursor control device, keyboard, button, touchpad, touch screen, stylus, remote control (such as an infrared remote control), microphone, camera, video recorder, gesture systems (e.g., eye movement, head movement, etc.), speaker, LED, light, joystick, game pad, switch, buzzer, bell, and/or other user input/output device for communicating with one or more users or for entering information into the system. These and other devices for interacting with the system may be connected to the system through I/O device interface(s) via a system bus, but can be connected by other interfaces such as a parallel port, IEEE 1394 serial port, a game port, a USB port, an IR interface, etc. Output devices may include any type of device for presenting information to a user, including but not limited to, a computer monitor, flat-screen display, or other visual display, a printer, and/or speakers or any other device for providing information in audio form, such as a telephone, a plurality of output devices, or any combination of output devices.

A system may also include one or more buses operable to transmit communications between the various hardware components. A system bus may be any of several types of bus structure that can further interconnect, for example, to a memory bus (with or without a memory controller) and/or a peripheral bus (e.g., PCI, PCIe, AGP, LPC, I2C, SPI, USB, etc.) using any of a variety of commercially available bus architectures.

One or more programs or applications, such as a web browser and/or other executable applications, may be stored in one or more of the system data storage devices. Generally, programs may include routines, methods, data structures, other software components, etc., that perform particular tasks or implement particular abstract data types. Programs or applications may be loaded in part or in whole into a main memory or processor during execution by the processor. One or more processors may execute applications or programs to run systems or methods of the present disclosure, or portions thereof, stored as executable programs or program code in the memory, or received from the Internet or other network. Any commercial or freeware web browser or other application capable of retrieving content from a network and displaying pages or screens may be used. In some embodiments, a customized application may be used to access, display, and update information. A user may interact with the system, programs, and data stored thereon or accessible thereto using any one or more of the input and output devices described above.

A system of the present disclosure can operate in a networked environment using logical connections via a wired and/or wireless communications subsystem to one or more networks and/or other computers. Other computers can include, but are not limited to, workstations, servers, routers, personal computers, microprocessor-based entertainment appliances, peer devices, or other common network nodes, and may generally include many or all of the elements described above. Logical connections may include wired and/or wireless connectivity to a local area network (LAN), a wide area network (WAN), hotspot, a global communications network, such as the Internet, and so on. The system may be operable to communicate with wired and/or wireless devices or other processing entities using, for example, radio technologies, such as the IEEE 802.xx family of standards, and includes at least Wi-Fi (wireless fidelity), WiMax, and Bluetooth wireless technologies. Communications can be made via a predefined structure as with a conventional network or via an ad hoc communication between at least two devices.

Hardware and software components of the present disclosure, as discussed herein, may be integral portions of a single computer, server, controller, or message sign, or may be connected parts of a computer network. The hardware and software components may be located within a single location or, in other embodiments, portions of the hardware and software components may be divided among a plurality of locations and connected directly or through a global computer information network, such as the Internet. Accordingly, aspects of the various embodiments of the present disclosure can be practiced in distributed computing environments where certain tasks are performed by remote processing devices that are linked through a communications network. In such a distributed computing environment, program modules may be located in local and/or remote storage and/or memory systems.

As will be appreciated by one of skill in the art, the various embodiments of the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, middleware, microcode, hardware description languages, etc.), or an embodiment combining software and hardware aspects. Furthermore, embodiments of the present disclosure may take the form of a computer program product on a computer-readable medium or computer-readable storage medium, having computer-executable program code embodied in the medium, that define processes or methods described herein. A processor or processors may perform the necessary tasks defined by the computer-executable program code. Computer-executable program code for carrying out operations of embodiments of the present disclosure may be written in an object oriented, scripted or unscripted programming language such as Java, Perl, PHP, Visual Basic, Smalltalk, C++, or the like. However, the computer program code for carrying out operations of embodiments of the present disclosure may also be written in conventional procedural programming languages, such as the C programming language or similar programming languages. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the context of this document, a computer readable medium may be any medium that can contain, store, communicate, or transport the program for use by or in connection with the systems disclosed herein. The computer-executable program code may be transmitted using any appropriate medium, including but not limited to the Internet, optical fiber cable, radio frequency (RF) signals or other wireless signals, or other mediums. The computer readable medium may be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

Various embodiments of the present disclosure may be described herein with reference to flowchart illustrations and/or block diagrams of methods, apparatus (systems), and computer program products. It is understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks. Alternatively, computer program implemented steps or acts may be combined with operator or human implemented steps or acts in order to carry out an embodiment of the invention.

Additionally, although a flowchart or block diagram may illustrate a method as comprising sequential steps or a process as having a particular order of operations, many of the steps or operations in the flowchart(s) or block diagram(s) illustrated herein can be performed in parallel or concurrently, and the flowchart(s) or block diagram(s) should be read in the context of the various embodiments of the present disclosure. In addition, the order of the method steps or process operations illustrated in a flowchart or block diagram may be rearranged for some embodiments. Similarly, a method or process illustrated in a flow chart or block diagram could have additional steps or operations not included therein or fewer steps or operations than those shown. Moreover, a method step may correspond to a method, a function, a procedure, a subroutine, a subprogram, etc.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

We claim:

1. A method for seasoning a container for storing an asset, the method comprising:
   determining, using a humidity sensor, a humidity condition outside the container;
   determining, using the humidity sensor, a humidity condition inside the container;
   determining at least one dimension of the container;
   determining a desired humidity level;
   based on the humidity conditions, dimension, and desired humidity level, identifying a humidity controller for seasoning the container; and
   recommending the identified humidity controller.

2. The method of claim 1, wherein the at least one dimension comprises at least one of: an outer dimension, an inner dimension, and a thickness.

3. The method of claim 1, further comprising receiving container information comprising a material of the container.

4. The method of claim 2, wherein determining at least one dimension comprises receiving a measurement input.

5. The method of claim 2, wherein determining at least one dimension comprises receiving a photograph of the container and a reference object, and extracting the dimension from the photograph.

6. The method of claim 1, wherein the desired humidity level is an optimal humidity level for an asset to be stored in the container.

7. The method of claim 6, wherein the optimal humidity level for an asset to be stored in the container is determined by accessing a lookup table.

8. The method of claim 1, further comprising monitoring, using the humidity sensor, a humidity condition in the container during seasoning.

9. The method of claim 8, further comprising generating a notification when seasoning is substantially complete.

10. The method of claim 1, further comprising:
    identifying, based on the desired humidity level, a suitable humidity controller for maintaining the desired humidity level within the container; and
    recommending the identified suitable humidity controller.

11. A system for seasoning a container for storing an asset, the system comprising:
    a humidity sensor configured for sensing a relative humidity;
    a database storing humidity data sensed by the humidity sensor and a lookup table comprising optimal humidity levels for assets;
    a processor encoded with computer-readable instructions to:
      determine, using the humidity sensor, a humidity condition outside the container;
      determine, using the humidity sensor, a humidity condition inside the container;
      determine at least one dimension of the container;
      determine a desired humidity level;
      based on the humidity conditions, dimension, and desired humidity level, identify a humidity controller for seasoning the container; and
      recommend the identified humidity controller; and
    a user interface in wireless communication with the processor and configured to display the recommendation.

12. The system of claim 11, wherein the processor is further encoded with computer-readable instructions to:
- identify, based on the desired humidity level, a suitable humidity controller for maintaining the container at the desired humidity level; and
- recommend the identified suitable humidity controller.

13. The system of claim 11, wherein the at least one dimension comprises at least one of: an outer dimension, an inner dimension, and a thickness.

14. The system of claim 13, wherein determining at least one dimension comprises receiving a measurement input.

15. The system of claim 13, wherein determining at least one dimension comprises receiving a photograph of the container and a reference object, and extracting the dimension from the photograph.

16. The system of claim 11, wherein the desired humidity level is an optimal humidity level for an asset to be stored in the container.

17. The system of claim 16, wherein the optimal humidity level for an asset to be stored in the container is determined by accessing a lookup table.

* * * * *